(12) United States Patent
Bryan et al.

(10) Patent No.: US 10,791,145 B2
(45) Date of Patent: *Sep. 29, 2020

(54) ATTACHING WEB SERVICE POLICIES TO A GROUP OF POLICY SUBJECTS

(71) Applicant: Oracle International Corporation, Redwood Shores, CA (US)

(72) Inventors: Jeffrey Jason Bryan, Mountain House, CA (US); Nickolas Kavantzas, Emerald Hills, CA (US); Prakash Yamuna, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,760

(22) Filed: Jan. 18, 2017

(65) Prior Publication Data

US 2017/0126743 A1 May 4, 2017

Related U.S. Application Data

(63) Continuation of application No. 13/118,947, filed on May 31, 2011, now Pat. No. 9,589,145.

(Continued)

(51) Int. Cl.
*H04L 29/06* (2006.01)
*G06F 21/60* (2013.01)

(52) U.S. Cl.
CPC ............ *H04L 63/20* (2013.01); *G06F 21/604* (2013.01); *H04L 63/10* (2013.01); *G06F 2221/2145* (2013.01)

(58) Field of Classification Search
CPC ....... H04L 63/20; H04L 63/10; G06F 21/604; G06F 2221/2145
See application file for complete search history.

(56) References Cited

U.S. PATENT DOCUMENTS

| 5,797,128 A | 8/1998 | Birnbaum | |
| 5,889,953 A * | 3/1999 | Thebaut | G06F 21/30 709/221 |

(Continued)

OTHER PUBLICATIONS

US 9,195,468 B2, 11/2015, Fillipi et al. (withdrawn)

(Continued)

*Primary Examiner* — Alford W Kindred
*Assistant Examiner* — Lin Lin M Htay
(74) *Attorney, Agent, or Firm* — Kilpatrick Townsend & Stockton LLP

(57) ABSTRACT

In one set of embodiments, methods, systems, and apparatus are provided to attach one or more service policies to resources in an enterprise by receiving a first service policy, receiving a first policy attachment that identifies one or more policy attachment attributes of resources in the enterprise, and generate a first global policy attachment that references the first policy attachment and the first service policy. The method can include receiving a request to access a resource including an attribute that matches one of the policy attachment attributes. The method can include determining that the first service policy is an effective policy for the resource based on the matching resource attribute with the policy attachment attribute. The method can include controlling access to the resource responsive to the request using the effective policy.

19 Claims, 13 Drawing Sheets

Related U.S. Application Data

(60) Provisional application No. 61/417,185, filed on Nov. 24, 2010.

(56) References Cited

U.S. PATENT DOCUMENTS

| | | |
|---|---|---|
| 6,064,656 A | 5/2000 | Angal et al. |
| 6,167,445 A | 12/2000 | Gai et al. |
| 6,381,639 B1 | 4/2002 | Thebaut et al. |
| 6,516,416 B2 | 2/2003 | Gregg et al. |
| 6,578,076 B1 | 6/2003 | Putzolu |
| 6,944,183 B1 | 9/2005 | Iyer et al. |
| 6,952,728 B1 | 10/2005 | Alles et al. |
| 7,197,741 B1 | 3/2007 | Stapf |
| 7,213,068 B1 | 5/2007 | Kohli et al. |
| 7,290,288 B2 | 10/2007 | Gregg et al. |
| 7,350,204 B2 | 3/2008 | Lambert et al. |
| 7,424,702 B1 | 9/2008 | Vinodkrishnan et al. |
| 7,444,643 B2 | 10/2008 | Lo et al. |
| 7,478,419 B2 | 1/2009 | Anderson et al. |
| 7,543,276 B2 | 6/2009 | Pfander et al. |
| 7,607,164 B2 | 10/2009 | Vasishth et al. |
| 7,647,415 B1 | 1/2010 | Sandoz et al. |
| 7,725,605 B2 | 5/2010 | Palmeri et al. |
| 7,796,760 B2 | 9/2010 | Brettle et al. |
| 7,855,972 B2 | 12/2010 | Pettit et al. |
| 7,877,264 B2 | 1/2011 | Fox et al. |
| 7,877,409 B2* | 1/2011 | Lim .................. G06F 17/3089 707/781 |
| 8,005,930 B2 | 8/2011 | Abeln et al. |
| 8,104,080 B2 | 1/2012 | Burns et al. |
| 8,145,784 B2 | 3/2012 | See et al. |
| 8,156,538 B2 | 4/2012 | Kanade et al. |
| 8,265,969 B2 | 9/2012 | Comstock et al. |
| 8,307,413 B2 | 11/2012 | Smadja et al. |
| 8,417,709 B2 | 4/2013 | Chiticariu et al. |
| 8,448,216 B2 | 5/2013 | Liu et al. |
| 8,484,693 B2 | 7/2013 | Cox et al. |
| 8,560,819 B2 | 10/2013 | Fillipi et al. |
| 8,635,682 B2 | 1/2014 | Kavantzas et al. |
| 8,650,250 B2 | 2/2014 | Yamuna et al. |
| 8,650,288 B2 | 2/2014 | Yamuna et al. |
| 8,726,349 B2 | 5/2014 | Kavantzas et al. |
| 8,875,306 B2 | 10/2014 | Lowes |
| 8,914,843 B2 | 12/2014 | Bryan et al. |
| 8,973,117 B2 | 3/2015 | Kavantzas et al. |
| 9,003,478 B2 | 4/2015 | Kavantzas et al. |
| 9,021,055 B2 | 4/2015 | Kavantzas et al. |
| 9,043,864 B2 | 5/2015 | Kavantzas et al. |
| 9,055,068 B2 | 6/2015 | Bryan et al. |
| 9,088,571 B2 | 7/2015 | Bryan et al. |
| 9,143,511 B2 | 9/2015 | Bryan et al. |
| 9,262,176 B2 | 2/2016 | Fillipi et al. |
| 9,589,145 B2 | 3/2017 | Bryan et al. |
| 2002/0049749 A1* | 4/2002 | Helgeson ............. G06F 9/468 709/203 |
| 2002/0124067 A1 | 9/2002 | Parupudi et al. |
| 2002/0143914 A1 | 10/2002 | Cihula |
| 2002/0184525 A1 | 12/2002 | Cheng |
| 2003/0023587 A1 | 1/2003 | Dennis et al. |
| 2003/0074367 A1 | 4/2003 | Kaler et al. |
| 2003/0115179 A1 | 6/2003 | Prabakaran et al. |
| 2003/0115484 A1 | 6/2003 | Moriconi et al. |
| 2003/0229501 A1 | 12/2003 | Copeland et al. |
| 2004/0015487 A1 | 1/2004 | Lin et al. |
| 2004/0015488 A1 | 1/2004 | Anonsen et al. |
| 2004/0039594 A1 | 2/2004 | Narasimhan et al. |
| 2004/0042470 A1* | 3/2004 | Cooper et al. ................ 370/401 |
| 2004/0103046 A1 | 5/2004 | Christoph et al. |
| 2004/0177139 A1 | 9/2004 | Schuba et al. |
| 2004/0181775 A1 | 9/2004 | Anonsen et al. |
| 2004/0189708 A1 | 9/2004 | Larcheveque et al. |
| 2005/0038790 A1 | 2/2005 | Wolthusen |
| 2005/0080914 A1 | 4/2005 | Lerner et al. |
| 2005/0086197 A1 | 4/2005 | Boubez et al. |
| 2005/0091352 A1 | 4/2005 | Alex et al. |
| 2005/0097061 A1* | 5/2005 | Shapiro ............... G06F 21/6209 705/67 |
| 2005/0114243 A1 | 5/2005 | Scumniotales et al. |
| 2005/0223109 A1 | 10/2005 | Mamou et al. |
| 2006/0037076 A1* | 2/2006 | Roy ...................... G06F 17/277 726/22 |
| 2006/0041565 A1 | 2/2006 | Cuomo et al. |
| 2006/0053120 A1 | 3/2006 | Shum et al. |
| 2006/0075465 A1 | 4/2006 | Ramanathan et al. |
| 2006/0088276 A1 | 4/2006 | Cho et al. |
| 2006/0089938 A1 | 4/2006 | Leonard et al. |
| 2006/0117063 A1* | 6/2006 | Havewala et al. ......... 707/104.1 |
| 2006/0206440 A1 | 9/2006 | Anderson et al. |
| 2006/0230430 A1 | 10/2006 | Hondo et al. |
| 2006/0253420 A1* | 11/2006 | Hinton ................... G06F 21/62 |
| 2006/0282876 A1 | 12/2006 | Shelest et al. |
| 2007/0006278 A1 | 1/2007 | Ioan Avram et al. |
| 2007/0028304 A1* | 2/2007 | Brennan ................ G06F 21/55 726/24 |
| 2007/0033194 A1* | 2/2007 | Srinivas ................. G06Q 30/02 |
| 2007/0118576 A1 | 5/2007 | Moore et al. |
| 2007/0157287 A1 | 7/2007 | Lim |
| 2007/0204324 A1 | 8/2007 | Roberts et al. |
| 2007/0266032 A1 | 11/2007 | Blumenau |
| 2007/0266422 A1 | 11/2007 | Germano et al. |
| 2007/0282879 A1 | 12/2007 | Degenkolb et al. |
| 2008/0040364 A1 | 2/2008 | Li |
| 2008/0046335 A1 | 2/2008 | Zhou |
| 2008/0046961 A1 | 2/2008 | Pouliot |
| 2008/0065426 A1 | 3/2008 | Liu et al. |
| 2008/0066189 A1 | 3/2008 | Liu et al. |
| 2008/0071805 A1 | 3/2008 | Mourra et al. |
| 2008/0082660 A1 | 4/2008 | Bachmann et al. |
| 2008/0091682 A1 | 4/2008 | Lim |
| 2008/0098453 A1 | 4/2008 | Hinton et al. |
| 2008/0148345 A1 | 6/2008 | Rubio |
| 2008/0155641 A1 | 6/2008 | Beavin et al. |
| 2008/0184201 A1 | 7/2008 | Burns et al. |
| 2008/0189760 A1 | 8/2008 | Rosenberg et al. |
| 2008/0225748 A1 | 9/2008 | Khemani et al. |
| 2008/0229381 A1 | 9/2008 | Sikka et al. |
| 2008/0244692 A1 | 10/2008 | Chang |
| 2008/0244693 A1 | 10/2008 | Chang |
| 2008/0256593 A1 | 10/2008 | Vinberg et al. |
| 2008/0288651 A1 | 11/2008 | Brauel et al. |
| 2008/0301757 A1 | 12/2008 | Demarest et al. |
| 2008/0320550 A1 | 12/2008 | Strassner et al. |
| 2009/0049518 A1 | 2/2009 | Roman et al. |
| 2009/0070853 A1 | 3/2009 | Chung et al. |
| 2009/0099860 A1 | 4/2009 | Karabulut et al. |
| 2009/0099882 A1 | 4/2009 | Karabulut |
| 2009/0106816 A1 | 4/2009 | Ito |
| 2009/0125612 A1 | 5/2009 | Rabetge et al. |
| 2009/0150824 A1 | 6/2009 | Furuichi |
| 2009/0177929 A1 | 7/2009 | Sijelmassi |
| 2009/0193057 A1 | 7/2009 | Maes |
| 2009/0205013 A1 | 8/2009 | Lowes |
| 2009/0281996 A1 | 11/2009 | Liu et al. |
| 2009/0300712 A1 | 12/2009 | Kaufmann et al. |
| 2010/0030860 A1 | 2/2010 | Iwasawa et al. |
| 2010/0030880 A1 | 2/2010 | Joshi et al. |
| 2010/0030890 A1 | 2/2010 | Dutta et al. |
| 2010/0064184 A1 | 3/2010 | Almeida et al. |
| 2010/0077455 A1 | 3/2010 | Nishio et al. |
| 2010/0100810 A1 | 4/2010 | Nakamura et al. |
| 2010/0115075 A1 | 5/2010 | Chen et al. |
| 2010/0125477 A1 | 5/2010 | Mousseau et al. |
| 2010/0125665 A1 | 5/2010 | Simpson et al. |
| 2010/0153695 A1 | 6/2010 | Bussard et al. |
| 2010/0175105 A1 | 7/2010 | Vasishth et al. |
| 2010/0217853 A1 | 8/2010 | Alexander et al. |
| 2010/0235915 A1 | 9/2010 | Memon et al. |
| 2010/0269148 A1 | 10/2010 | Almeida et al. |
| 2010/0281455 A1 | 11/2010 | Anand et al. |
| 2010/0281516 A1 | 11/2010 | Lerner et al. |
| 2011/0035650 A1 | 2/2011 | Jardine-Skinner et al. |
| 2011/0047451 A1* | 2/2011 | Jardine-Skinner et al. .. 715/234 |
| 2011/0131275 A1 | 6/2011 | Maida-Smith et al. |

(56) References Cited

U.S. PATENT DOCUMENTS

| | | |
|---|---|---|
| 2011/0302239 A1 | 12/2011 | Grateau et al. |
| 2011/0321122 A1 | 12/2011 | Mwangi et al. |
| 2012/0054163 A1 | 3/2012 | Liu et al. |
| 2012/0054496 A1 | 3/2012 | Abeln et al. |
| 2012/0093031 A1 | 4/2012 | Wang et al. |
| 2012/0102182 A1 | 4/2012 | Voskuil et al. |
| 2012/0110093 A1 | 5/2012 | Tingstrom et al. |
| 2012/0131091 A1 | 5/2012 | Yamuna et al. |
| 2012/0131134 A1 | 5/2012 | De Foy et al. |
| 2012/0131135 A1 | 5/2012 | Yamuna et al. |
| 2012/0131164 A1 | 5/2012 | Bryan et al. |
| 2012/0131469 A1 | 5/2012 | Yamuna et al. |
| 2012/0131641 A1 | 5/2012 | Kavantzas et al. |
| 2012/0131654 A1 | 5/2012 | Kavantzas et al. |
| 2012/0216100 A1 | 8/2012 | Jardine-Skinner et al. |
| 2012/0311309 A1 | 12/2012 | Fillipi et al. |
| 2012/0311658 A1 | 12/2012 | Dozier |
| 2013/0086184 A1 | 4/2013 | Kavantzas et al. |
| 2013/0086240 A1 | 4/2013 | Bryan et al. |
| 2013/0086241 A1 | 4/2013 | Bryan et al. |
| 2013/0086242 A1 | 4/2013 | Bryan et al. |
| 2013/0086626 A1 | 4/2013 | Kavantzas et al. |
| 2013/0086627 A1 | 4/2013 | Bryan et al. |
| 2013/0262646 A1 | 10/2013 | Fiebig et al. |
| 2013/0347062 A1 | 12/2013 | Matityahu et al. |
| 2014/0013092 A1 | 1/2014 | Fillipi et al. |
| 2014/0096188 A1 | 4/2014 | Mont et al. |
| 2014/0109195 A1 | 4/2014 | Kavantzas et al. |
| 2014/0129706 A1 | 5/2014 | Yamuna et al. |
| 2014/0179271 A1 | 6/2014 | Guccione et al. |

OTHER PUBLICATIONS

U.S. Patent Application No. 14/148,400, Notice of Allowance mailed on May 10, 2017, 5 pp.
U.S. Appl. No. 13/118,876, Notice of Allowance dated Jun. 12, 2013, 9 pages.
U.S. Appl. No. 13/118,940, Final Office Action dated Aug. 29, 2013, 10 pages.
U.S. Appl. No. 13/118,940, Non-Final Office Action dated Feb. 13, 2013, 9 pages.
U.S. Appl. No. 13/118,940, Notice of Allowance dated Jan. 15, 2014, 5 pages.
U.S. Appl. No. 13/118,944, Corrected Notice of Allowability dated Dec. 16, 2013, 5 pages.
U.S. Appl. No. 13/118,944, Non-Final Office Action dated May 16, 2013, 31 pages.
U.S. Appl. No. 13/118,944, Notice of Allowance dated Oct. 10, 2013, 10 pages.
U.S. Appl. No. 13/118,947, Final Office Action dated Jan. 15, 2015, 32 pages.
U.S. Appl. No. 13/118,947, Final Office Action dated Feb. 16, 2016, 41 pages.
U.S. Appl. No. 13/118,947, Non-Final Office Action dated Jun. 20, 2014, 31 pages.
U.S. Appl. No. 13/118,947, Non-Final Office Action dated Jul. 31, 2015, 37 pages.
U.S. Appl. No. 13/118,947, Notice of Allowance dated Oct. 19, 2016, 19 pages.
U.S. Appl. No. 13/149,037, Non-Final Office Action dated May 1, 2013, 9 pages.
U.S. Appl. No. 13/149,037, Notice of Allowance dated Oct. 8, 2013, 7 pages.
U.S. Appl. No. 13/149,049, Non-Final Office Action dated Mar. 5, 2013, 15 pages.
U.S. Appl. No. 13/149,049, Notice of Allowance dated Sep. 17, 2013, 10 pages.
U.S. Appl. No. 13/149,065, Advisory Action dated Sep. 17, 2013, 5 pages.
U.S. Appl. No. 13/149,065, Final Office Action dated Jul. 3, 2013, 21 pages.
U.S. Appl. No. 13/149,065, Non-Final Office Action dated Jul. 14, 2014, 23 pages.
U.S. Appl. No. 13/149,065, Non-Final Office Action dated Dec. 4, 2012, 30 pages.
U.S. Appl. No. 13/149,065, Notice of Allowance dated Dec. 29, 2014, 10 pages.
U.S. Appl. No. 13/436,933, Final Office Action dated Aug. 29, 2014, 28 pages.
U.S. Appl. No. 13/436,933, Non-Final Office Action dated Feb. 20, 2014, 25 pages.
U.S. Appl. No. 13/436,933, Notice of Allowance dated Jan. 21, 2015, 21 pages.
U.S. Appl. No. 13/436,940, Advisory Action dated Apr. 22, 2014, 5 pages.
U.S. Appl. No. 13/436,940, Corrected Notice of Allowability dated Nov. 21, 2014, 2 pages.
U.S. Appl. No. 13/436,940, Final Office Action dated Jan. 28, 2014, 22 pages.
U.S. Appl. No. 13/436,940, Non-Final Office Action dated Jul. 15, 2013, 31 pages.
U.S. Appl. No. 13/436,940, Notice of Allowance dated Aug. 12, 2014, 13 pages.
U.S. Appl. No. 13/596,525, Final Office Action dated Nov. 26, 2014, 15 pages.
U.S. Appl. No. 13/596,525, Non-Final Office Action dated May 30, 2014, 15 pages.
U.S. Appl. No. 13/596,525, Notice of Allowance dated Mar. 13, 2015, 12 pages.
U.S. Appl. No. 13/596,545, Non-Final Office Action dated Aug. 4, 2014, 27 pages.
U.S. Appl. No. 13/596,545, Notice of Allowance dated Nov. 25, 2014, 15 pages.
U.S. Appl. No. 13/596,861, Final Office Action dated Oct. 3, 2014, 30 pages.
U.S. Appl. No. 13/596,861, Non-Final Office Action dated Apr. 10, 2014, 29 pages.
U.S. Appl. No. 13/596,861, Notice of Allowance dated Mar. 13, 2015, 22 pages.
U.S. Appl. No. 13/596,891, Corrected Notice of Allowability dated Apr. 8, 2015, 2 pages.
U.S. Appl. No. 13/596,891, Final Office Action dated Oct. 2, 2014, 11 pages.
U.S. Appl. No. 13/596,891, Non-Final Office Action dated Apr. 25, 2014, 10 pages.
U.S. Appl. No. 13/596,891, Notice of Allowance dated Feb. 2, 2015, 5 pages.
U.S. Appl. No. 14/026,767, Non-Final Office Action dated Mar. 4, 2014, 7 pages.
U.S. Appl. No. 14/026,767, Notice of Allowance dated Dec. 8, 2015, 5 pages.
U.S. Appl. No. 14/026,767, Notice of Allowance dated Sep. 8, 2014, 9 pages.
U.S. Appl. No. 14/106,037, Non-Final Office Action dated Jul. 16, 2014, 16 pages.
U.S. Appl. No. 14/106,037, Notice of Allowance dated Oct. 24, 2014, 9 pages.
U.S. Appl. No. 14/148,400, Final Office Action dated Sep. 9, 2016, 9 pages.
U.S. Appl. No. 14/148,400, Non-Final Office Action dated Mar. 10, 2016, 22 pages.
Bajaj et al., Web Services Policy Framework (WS-Policy), BEA systems Inc. et al. version 1.2, Mar. 2006, 29 pages.
Christensen et al., Web Services Description Language (WSDL), World Wide Web Consortium version 1.1, Mar. 2001, 29 pages.
Lon et al., Extending the Java Virtual Machine to Enforce Fine-Grained Security Policies in Mobile Devices, Twenty-Third Annual Computer Security Applications Conference Dec. 2007, pp. 233-242.
Montanari et al., Policy-based Separation of Concerns for Dynamic Code Mobility Management, Proceedings of the 27th Annual International Computer Software and Applications Conference, Nov. 2003, pp. 82-90.

(56) References Cited

OTHER PUBLICATIONS

Nordbotten, XML and Web Services Security Standards, Communications Surveys & Tutorials, IEEE, vol. 11, No. 3, Oct. 3, 2009, pp. 4-21.

Phan et al., Quality-Driven Business Policy Specification and Refinement for Service-Oriented Systems, Springer-Verlag, Berlin Heidelberg, 2008, pp. 5-21.

Schuba et al., Scaling Network Services Using Programmable Network Devices, IEEE Computer Society, vol. 38, No. 4, Apr. 2005, pp. 52-60.

Shute et al., DataPower SOA Appliance Service Planning, Implementation, and Best Practices, IBM Redbook, Jun. 28, 2011, 160 pages.

\* cited by examiner em_domain

WebLogic Domain ▶ — 706

Policy Set Summary ⓘ

Use this page to create, done, edit, view, delete policy sets.

Type of Resources [All ▼] — 708
710

Name [_____]

➕ Create  📋 Create Like  👁 View  ✏ Edit  ✖ Delete — 712

| Name | Version | Enabled | Type of Resources | Description | |
|---|---|---|---|---|---|
| all-soa-service | 2 | ✓ | SOA Service | Policy set for all SOA ser... | 👁 |
| all-domains-default-web-service-policies | 1 | ✓ | Web Service End... | Default policies for web s... | 👁 |

714 — View Full Description

700

Logged in as weblogic
Page Refreshed Sep 3, 2010 9:29:29 AM PDT

702 —
- Farm_em_domain — 705
  - Application Deployments
  - Internal Applications
  - Resource Adapters
    - CO_ADFBC_CO_ADFBC (soa_se
    - composer (soa_server1)
    - DefaultToDoTaskFlow (soa_serv
    - worklistapp (soa_server1)
  - SOA
    - soa-infra (soa_server1)
      - default
        - CO_SOA_ADFBC [3.0]
  - WebLogic Domain
    - em_domain — 704
      - AdminServer
      - soa_server1
  - Metadata Repositories

FIG. 7

802 — em_domain
WebLogic Domain ▼

Logged in as weblogic
Page Refreshed Sep 3, 2010 11:39:44 AM PDT

Policy Sets > View Policy Set
View Policy Set ⓘ

[ Return to Policy Sets ]

General Information

| | |
|---|---|
| Name | all-domains-default-web-service-policies |
| Enabled | ✓ |
| Type of Resources | Web Service Endpoint |
| Description | Default policies for web services in any domain |

Version Number: 1
Last Updated: Sep 3, 2010 9:22:27 AM
Updated By: weblogic

804

Scope of Resources — 806

| Scope | Pattern |
|---|---|
| Domain Name | em_domain |

Policy References — 808

| Name | ▲▽ | Category | Enabled | Description | View Detail |
|---|---|---|---|---|---|
| oracle/wss11_saml_or_username_token_with_message_protection_service_policy | | Security | ✓ | This policy enforces messa... | 👁 |
| oracle/binding_authorization_denyall_policy | | Security | ✓ | This policy is a special c... | 👁 |

FIG. 8

Enter General Information — Enter Resource Scope — Add Policy References

Enter General Information

Enter basic policy set information, such as name, description, and resource type. Click Next to enter the resource scope.

* Name: all-domains-default-web-service-policies
Enabled: ✓
* Type of Resources: Web Service Endpoint
Description: Default policies for web services in any domain Validate | Cancel | Step 1 of 4 | Next

FIG. 9

Enter Resource Scope

Enter at least one pattern string to define the scope of resources for the policy set. Use an asterisk (*) as a wildcard character anywhere within the string to match any number of characters at its position. You can specify multiple wildcards within the string. Provide only a single pattern for a scope. For resource scopes that do not include a pattern string, an asterisk (*) is assumed.

Name all-domains-default-web-service-policies —1006
Type of Resources [Web Service Endpoint]

| Scope | Pattern |
|---|---|
| Domain Name | em_domain —1012 |
| Server Instance Name | |
| Application Name | |
| Application Module Name | |

Enter General Information — Enter Resource Scope — Add Policy References

[Validate] [Cancel] [Back] Step 2 of 4 [Next] —1010

ATTACHING WEB SERVICE POLICIES TO A GROUP OF POLICY SUBJECTS

RELATED APPLICATIONS

This application is a continuation of U.S. Nonprovisional application Ser. No. 13/118,947, filed May 31, 2011, which claims the benefit and priority under 35 U.S.C. 119 (e) of U.S. Provisional Application Ser. No. 61/417,185, filed Nov. 24, 2010, entitled EXTERNALLY ATTACHING ONE OR MORE WEB SERVICE POLICIES TO A GROUP OF SIMILAR POLICY SUBJECTS, the contents of which are herein incorporated by reference in their entirety for all purposes.

This application also incorporates by reference for all purposes the entire contents of the following related and commonly-assigned non-provisional applications:

(1) U.S. application Ser. No. 13/149,037, now U.S. Pat. No. 8,650,250 issued Feb. 11, 2014 entitled Identifying Compatible Web Service Policies;

(2) U.S. application Ser. No. 13/118,940, now U.S. Pat. No. 8,726,349 issued May 13, 2014 entitled Optimizing Interactions Between Co-Located Processes;

(3) U.S. application Ser. No. 13/149,049, now U.S. Pat. No. 8,635,682 issued Jan. 21, 2014 entitled Propagating Security Identity Information to Components of a Composite Application;

(4) U.S. application Ser. No. 13/149,065, now U.S. Pat. No. 9,021,055 issued Apr. 28, 2015 entitled Nonconforming Web Service Policy Functions;

(5) U.S. application Ser. No. 13/118,944, now U.S. Pat. No. 8,650,288 issued Feb. 11, 2014 entitled Runtime Usage Analysis for a Distributed Policy Enforcement System

BACKGROUND

Embodiments of the present invention relate generally to configuration and management of distributed computer systems, and more particularly to configuration and use of service policies in such systems.

Enterprise computer systems can be structured as components that interact with each other via defined interfaces. A component that provides an element of functionality, such as executing a transaction, computing a value, storing information in a database, and other operations, can be provided in the form of a web service, which has a defined input service interface of one or more operations and associated input parameters, and, ordinarily, a defined reference interface of operations that the web service invokes, e.g., to delegate tasks to other web services. The reference interface corresponds to the service interface of the web service to be invoked. These invocations can be performed by, for example, sending messages via a computer network from an invoking service or application to the referenced service. Service Oriented Architectures (SOA) provide frameworks and conventions for creating applications using this service-oriented architecture.

SOA provides features for specifying desired "quality of service" parameters that applications and services are to adhere to when invoking services and processing service invocations, respectively. One type of quality of service is security, which includes user authentication, data encryption, authorization of users to perform particular operations, and the like. Security-related parameters, such as details of how security is to be implemented, e.g., which type of authentication and encryption to use, can be specified by system users or administrators as "security policies" that can be attached to or associated with service input interfaces and reference interfaces. A security policy can be understood as a data item that includes a specific value for a parameter, e.g., the name of a specific type of encryption. When a security policy is attached to a service, the service can implement security features in accordance with the parameters specified in the policy. Thus, application developers can provide flexible security features by implementing security with reference to policies that can be supplied later, e.g., when the application is deployed for use by a customer, or when the customer's security needs change. The customer can then provide specific policies to configure the security features, e.g., by specifying a particular type of encryption with a particular level of security. The customer associates a security policy with each security-sensitive service using an administrative tool, such as a graphical user interface. When security requirements change, the customer can change the policies accordingly. Other types of quality of service configuration can be performed similarly.

For example, the quality of service of network communication may be configurable between higher-quality settings that have slower performance and lower-quality settings that are faster. A network protocol quality of service parameter can be provided by the application, and a customer who deploys the application can specify a particular setting for the quality of service, e.g., reliable or guaranteed, by attaching a policy that specifies the particular setting to the services in the application.

SUMMARY

Service policies can be associated with, i.e., attached to, resources in an enterprise computing system to provide an assurance that the resources with which the service policies are associated will comply with the specified quality of service. For example, an authentication security policy that represents a particular type of authentication, e.g., that a user name and password are required, can be associated with a resource such as a bank account access service. These resources with which policies can be associated are collectively referred to as policy "subjects."

Service policies can be associated with policy subjects in various ways, including "direct" policy attachment and "global" policy attachment. A direct policy attachment is, in one aspect, an association between a particular policy and a particular subject. Although there may be variations that allow multiple policies to be attached to multiple subjects, e.g., bulk policy attachments, these variations ordinarily involve associating specific policies with specific subjects.

In one or more embodiments, global policy attachments are a more indirect form of association, in which particular policies can be associated with policy subjects by specifying desired attributes, i.e., characteristics, that the policy subjects are to have. The policy subjects that have attributes matching the desired attributes are automatically associated with the particular policies. The desired attributes are specified in the global policy attachment along with a policy that is to be attached to subjects that match the attributes. Such attachment of policies to subjects enforces quality of service requirements, including security assurances. The global policy attachments provide a mechanism for an administrator to be sure that all subjects are secured in situations where the developer, assembler, or deployer did not explicitly specify the policies to be attached.

One of the desired attributes can be a scope of policy subjects for the global policy attachment. The types of entities in an enterprise system, such as management domains, servers, applications, modules, services/references, and ports, can be assigned to corresponding levels in a containment hierarchy of an enterprise. The scope specifies one or more of the levels in the hierarchy by name. Each level contains the level(s) below it. The scope attribute associated with the global policy attachment is referred to herein as a policy attachment scope. Each policy subject corresponds to an entity in the enterprise system, and the scope of each policy subject is referred to as a subject scope.

When an operation is to be performed on a subject, e.g., to send a message to a service, the subject scope associated with the subject is compared to the policy attachment scope(s) associated with the global policy attachment. The policies that are attached to the subject, referred to as the effective set of policies, are determined by identifying global policy attachments having policy attachment scopes that include, e.g., match or contain, the subject scope. The identified global policy attachments refer to the policies that are attached to the subject. Once the policies have been identified, the policies can be evaluated to determine if the operation to be performed on the subject is permitted.

It is possible for more than one policy to be attached to a subject by the global policy attachment. In this case, policies that do not conflict with each other can be assigned to the same subject. If two policies that do conflict, e.g., by specifying two different authentication techniques for the same subject, are attached to different levels, the policy attached to the lower level is selected, thus giving higher priority to lower levels. If the two conflicting policies are attached to the same level, an error can be raised, or some other criteria can be used to select one of the policies.

According to an embodiment of the present invention, a method is provided that includes receiving, by a computer system, a reference to a first service policy, receiving, by the computer system, a first policy attachment scope that indicates a first scope of policy subjects to which the first service policy applies, generating, by the computer system, a first global policy attachment that references the first service policy and the first policy scope, and storing, by the computer system, the first global policy attachment on a storage medium.

Embodiments of the invention may include one or more of the following features. The method may include receiving, by the computer system, a request to access a policy subject associated with a subject scope, identifying, by the computer system, at least one effective policy referenced by at least one global policy attachment, where the at least one effective policy includes the first service policy referenced by the first global policy attachment if the first policy attachment scope matches or contains the subject scope, and granting, by the computer system, the request to access the policy subject based upon the at least one effective policy. The first policy attachment scope may include at least one wildcard, and the first policy attachment scope may match or contain the subject scope if the wildcard matches the subject scope. The first policy attachment scope and the subject scope may each correspond to respective levels that represent entities in an enterprise containment hierarchy, the levels ordered by breadth from a broad level to a narrow level, a first entity associated with a broader level contains one or more entities associated with a narrower level, and where the first policy attachment scope may contain the subject scope if the first policy attachment scope is broader than the subject scope.

Identifying at least one effective policy may include identifying a second service policy referenced by a second global policy attachment, the second global policy attachment references a second policy attachment scope, and the at least one effective policy includes the second service policy if the second policy attachment scope matches or contains the subject scope. The first service policy may be associated with a first policy category, the second service policy may be associated with a second policy category, and the at least one effective policy includes the second service policy if the second policy attachment scope matches or contains the subject scope and the first category is different from the second category. The first policy scope may have a first scope name that includes a first plurality of level names and the second policy scope having a second scope name that includes a second plurality of level names, where the first policy scope contains the second policy scope if the first scope name includes fewer level names than the second scope name, and the second plurality of level names includes the first plurality of level names in the same order and position that the names appear in the first plurality of level names, or if the first scope name includes more level names than the second scope name and the additional level names in the first scope name are wildcards that match any name.

The first policy scope may have a first scope name that includes a first plurality of level names and the second policy scope may have a second scope name that includes a second plurality of level names, where the first policy scope matches the second policy scope if the second scope includes a level name that equals or matches each level name in the first scope by wildcard matching. The method may further include receiving, by the computer system, at least one attribute value, where the first global policy attachment further references the at least one attribute value, where the at least one effective policy includes the first service policy if the first policy attachment scope matches or contains the subject scope and the at least one attribute value referenced by the global policy attachment is equal to a value of a corresponding attribute associated with the first service policy. The at least one attribute may include a policy subject type. The request may be granted if one or more assertions included in the at least one effective policy are satisfied.

According to an embodiment of the present invention, a system is provided that includes a processor configured to receive a first global policy attachment that references an attachment attribute value and a first service policy, receive a request to access a policy subject, the policy subject associated with a subject attribute value, identify at least one effective policy referenced by the first global policy attachment, where the at least one effective policy includes the first service policy if the attachment attribute value is equal to the subject attribute value, and grant the request to access the policy subject based upon the at least one effective policy.

Embodiments of the invention may include one or more of the following features. The first global policy attachment may further reference a first policy attachment scope that indicates a first scope of policy subjects to which the first service policy applies, and the policy subject may be further associated with a subject scope, where the at least one effective policy includes the first service policy referenced by the first global policy attachment if the attachment attribute value is equal to the subject attribute value and the first policy attachment scope matches or contains the subject scope.

According to an embodiment of the present invention, a non-transitory machine-readable medium for a computer system is provided that has stored thereon a series of instructions which, when executed by a processor, cause the processor to receive a reference to a first service policy, receive a first policy attachment scope that indicates a first scope of policy subjects to which the first service policy applies, generate a first global policy attachment that references the first service policy and the first policy scope, store the first global policy attachment on a storage medium.

Embodiments of the invention may include one or more of the following features. The instructions may further cause the processor to receive a request to access a policy subject associated with a subject scope, identify at least one effective policy referenced by at least one global policy attachment, where the at least one effective policy includes the first service policy referenced by the first global policy attachment if the first policy attachment scope matches or contains the subject scope, and grant, by the computer system, the request to access the policy subject based upon the at least one effective policy.

BRIEF DESCRIPTION OF THE DRAWINGS

FIGS. 7-11 illustrate global policy attachment user interfaces that can be used in accordance with embodiments of the invention.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
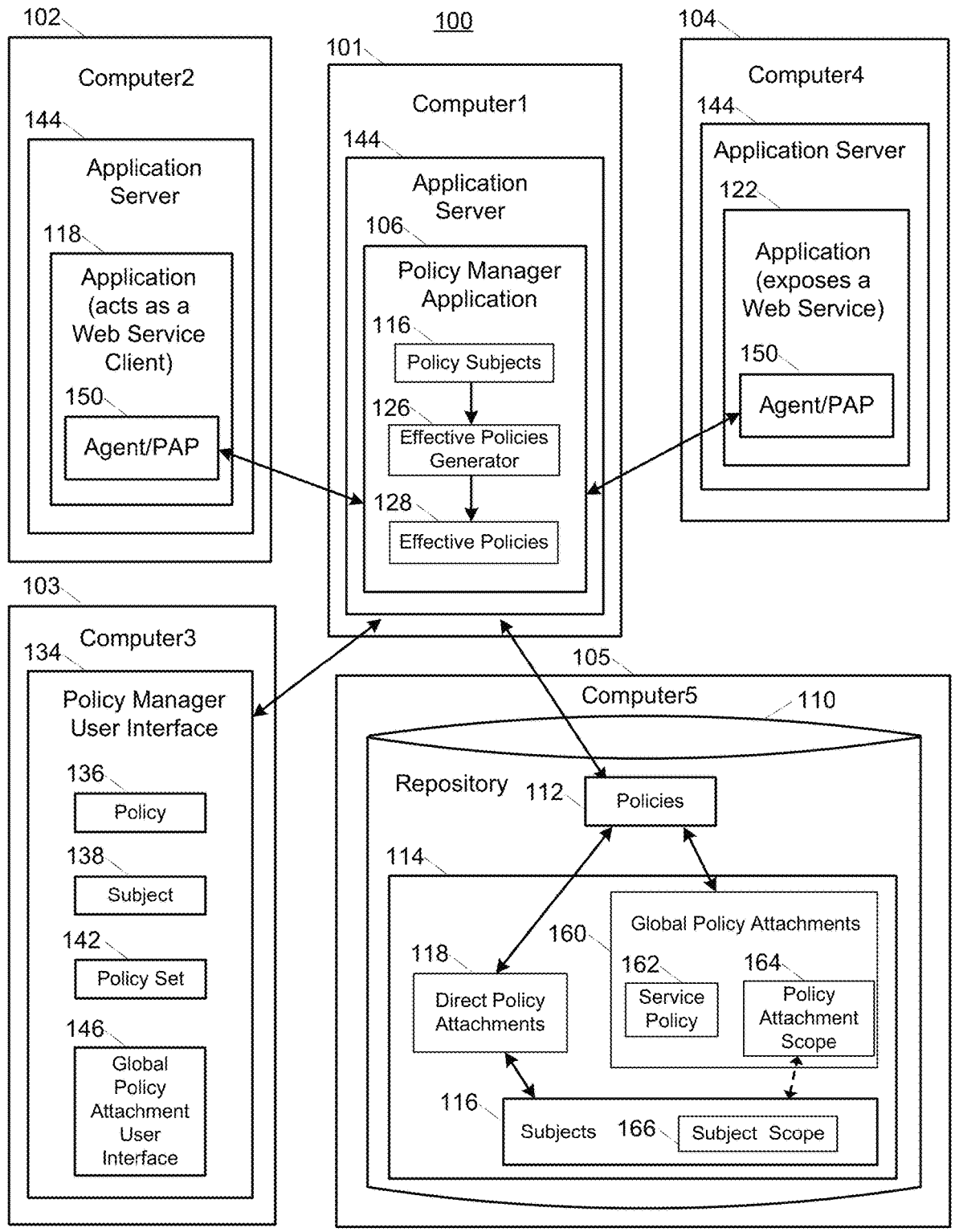
FIG. 1 is a simplified block diagram of service policy attachment features of an application server in a process execution system according to an embodiment of the present invention.

FIG. 1 is a simplified block diagram of service policy attachment features of an application server 144 hosted by a server computer 101 in a process execution system 100 according to an embodiment of the present invention. The system 100 may be a software system, a hardware system, an enterprise system, or the like. For example, the system 100 may be a complex enterprise software system such as a database system and related products provided by Oracle Corporation™ of California. As depicted in FIG. 1, the system 100 comprises several computers that communicate with each other via a network such as Ethernet, the Internet, a wireless network, or the like. Computer1 101 hosts, e.g., executes on a processor, an application server 144, which executes a Policy Manager Application ("PM") 106 that provides features for accessing documents 170, including policies 112 and associations 160 between the policies 112 and subjects 116, which are stored in a data storage repository 110. The application server 144 may be, for example, an Oracle® Fusion middleware server, or the like. The Policy Manager application 106 provides computers 102, 103, 104, and 105 with access to the policies 112 via network communication, as shown by the arrows between the PM 106 and Agent/Policy Access Point ("PAP") process 150 hosted on the computers 102 and 104, and to a policy manager user interface 134 hosted on Computer3 103, as well as to the repository 110 hosted on Computer5 105.

Computer2 102 hosts, e.g., loads and executes, an application server 144, which executes an application 118 that acts as a Web Service Client which is a policy subject 116. Computer2 102 also executes a PAP 150. The application server 144 uses the PAP 150 to communicate with the PM application hosted on Computer1 101. The PAP 150 also provides an effective policies generator 126, which generates an effective set of policies 128 as described below. The policy manager user interface 134 hosted on Computer3 103 enables users to manage the policies 112, as described in more detail below. Computer4 104 hosts an application server 144, which executes an application 122 that is exposed as a web service which is a policy subject 116. Computer4 104 also executes a PAP 150. Computer4's PAP 150 communicates with the application server 144 hosted on Computer1 101 via the PM application 106 on Computer1 101. Computer4's PAP 150 also provides an effective policies generator 126, which generates an effective set of policies 128 as described below.

Computer5 105 hosts a data storage repository 110, which may be, for example, a database, file system, or other type of storage. The repository 110 stores information used by the application server 144, such as definitions of the applications 122, communication endpoints, and other metadata such as data schemas. The applications 122 may be, e.g., Enterprise Java Beans, programs implemented in the Java® programming language or other programming language, Service Oriented Architecture (SOA) composite applications, processes, and the like. Instances of the Agent/PAP 150 retrieve and enforce the effective set of policies 128. The PAP instances 150 located on the various computers retrieve the policies 112, global policy attachments 160, and other documents from the repository 110 via an instance of the policy manager 106, which acts as a front-end to and communicates with the repository 110.

The application server 144 stores global policy attachments 160 in the repository 110, e.g., a database, file system, memory, or the like, and performs the task of automatically associating policy subjects 116 that match the desired attributes specified in each global policy attachment 160 with the service policy 112 specified in the attachment 160 by a policy reference 162. This automatic association process can occur at a time when the global policy attachments 160 are being defined in a user interface (i.e., as design time), or when the enterprise application server 144 is executing the applications 122 and checking that the applications 122 conform to the matching policies (i.e., at runtime). The application server 144 includes an effective policies generator 126 that determines the set of policies 128 that are effective, i.e., meet the desired criteria, for a particular subject 116. When the applications 122 are executing, i.e., at runtime, the application server 144 checks that interactions between the applications 122 conform to the set of effective policies 128, and prohibits any interaction that would violate at least one of the effective policies 128. Note that although the term "global" is used to refer to these attribute-based policy attachment specifications, "global" is not meant to indicate or imply that the attachments are global in an absolute sense. The global policy attachments do not necessarily apply to all resources in an enterprise system, although it may be possible to construct a policy attachment that does apply to all such resources. Global policy attachments ordinarily refer to a portion of the resources in an enterprise system, with the particular resources to which a global policy attachment applies being specified by the attachment's attributes.

It is possible for two or more policies 112 to be attached to the same subject 116, in which case the policy to use can be selected in one of several ways depending upon the attributes of the matching policies. In one aspect, since using certain policies together would create an ambiguity, e.g., a username/password authentication policy and a fingerprint authentication policy, each policy is classified in a category, and conflicts can occur between two policies if the two policies are in the same category. In the aforementioned example, two policies in the authentication category are specified, and there is an ambiguity as to which type of authentication to use. Therefore, no more than one policy of each category is ordinarily permitted, unless some other distinction is provided for the policies. If the two policies are in different categories, there is ordinarily no conflict between them, and both policies can be included in the effective set of policies. Alternatively, in one or more embodiments, policies with overlapping assertion categories attached at the same scope (or directly) are included in the effective policies set 128, even if the combination of the policies results in an invalid configuration.

In another aspect, if the two matching policies are in the same category, then one of the policies will be selected based on their scopes. The scopes of the two matching policies are compared, and if the two policies have different scopes, then the policy with the "narrower", i.e., more specific and farther from the top-level (domain) scope, is selected and included in the set of effective policies. In another aspect, if the two matching policies have the same scope, e.g., both have the scope "application", then one can be selected based upon other criteria, or a warning or error message can be generated. In one example, the user interface 134 can prevent the creation of global policy attachments that would create conflicts, so that if a user attempts to create a global policy that has a scope that could potentially match (e.g., at least partially overlap) the scope of an existing global policy of the same category, then the creation of the conflicting policy can be prevented and an error generated. Conflicts can also be detected at runtime when the set of effective policies is generated. If the effective policy generator identifies two or more policies with the same category and scope and type, and at least two of the policies are enabled, then an error message can be generated, or one of the policies can be selected based upon some other criteria. For example, if both an authentication by password policy and an authentication by thumbprint policy match the global policy attachment and have the same or matching scopes (e.g., both are *, or one is * and one is Production*), then a conflict occurs, and an error can be generated.

In one or more embodiments, the service policies 112 stored in the repository 110 define quality of service (QoS) levels, and the policy subjects 116 represent entities or resources to which the service policies 112 can be attached to enforce the quality of service levels. The service policies 112 can be, for example, security policies that indicate a type of authentication, authorization, or encryption to be applied to communication between and/or within the applications 122. The attachment of particular policies 112 to particular policy subjects 116 is represented by policy attachment metadata 114. Note that service policies are sometimes referred to herein as simply "policies" and policy subjects are sometimes referred to as "subjects" for purposes of brevity.

The subjects 116 represent various types of entities in the system 100, including applications, communication endpoints, such as web service clients, web services, other types of resources, and the like, to which the policies can be attached. Communication endpoints include web service clients, which are also referred to herein as "references," and web services, which are also referred to herein as "services." The policy attachments represented by the policy attachment metadata 114 can be created and modified by an administrative user via the policy manager user interface 134 or by other types of user interfaces, e.g., a command-line interface. In one or more embodiments, the policy subjects 116 can be Services, References, and Components that can be attached via direct policy attachments. In other embodiments, the policy subjects 116 can correspond to other types of entities such as other resources in the enterprise system. For example, applications server domains can be associated with applications 122 using global policy attachments, as described herein can be, for example, service or reference interfaces of an application 122. The process execution system 100 facilitates execution of the applications 122 in accordance with the service policies 112 that are attached to the applications 122 in accordance with the policy attachment metadata 114.

The policy attachment metadata 114 can include direct policy attachments 118 and/or global policy attachments 160. Policies 112 can be attached to subjects 116 by an association between a policy 112 and a subject 116, which is referred to as a direct attachment 118. In one example, direct policy attachments 118 reside in the same location as the metadata that describes the policy subject 116, e.g., in the application server 144. A second way to attach policies 112 to subjects 116 is by global attachment, which involves a global policy attachment 160 that can be defined by a user to attach a policy 112 to one or more subjects 116 if criteria defined by the global policy attachment 160 are met by the subjects 116. Thus the specific subject 116 need not be known at the time the global policy attachment 160 is created, and an arbitrary number of subjects 116 can be associated with a policy 112.

The Agent/PAP 150 can perform a portion of policy enforcement that involves checking whether a request to access a requested policy subject 116 can be granted and executed by the application server 144. In one example, if an application 122 requests access to a policy subject 116, the policy manager 106 determines whether any policies 112 are attached to the subject 116, and if so, checks that the attached policies are satisfied. For example, if a security policy that authenticates a user's identity by requesting a user name and password is attached to the subject 116, then, according to the security policy, the agent 150 checks that the user has provided a valid user name and password. If so, the agent 150 grants the request by the application 122 or other entity requesting access. Otherwise, if the policy check fails, e.g., if the user has not provided a valid password, then the agent 150 denies the request, and the requested operation does not occur. In other embodiments, this policy check can be performed by other components of the application server 144.

In one or more embodiments, to determine if a given policy subject 116 can be accessed by an application 122, the PAP 150 identifies the policies 112 that are attached to the subject 116. For direct policy attachments, the policies 112 can be determined from the direct attachments 118.

For global policy attachments, the policies 112 can be determined by finding global policy attachments 160 having attribute values, such as types, scopes, or the like, that match corresponding attribute values of the requested subject 116. In one or more embodiments, the attribute values include policy attachment scopes that are compared to policy subject scopes to determine if a policy 112 associated with a global policy attachment 160 is attached to a subject 116. The effective policies generator 126 inspects the global policy attachments 160 to generate an effective set of policies 128. The effective policies generator 126 identifies global policy attachments 160 having policy attachment scopes 164 that match or contain the requested subject scope 116. Each such identified global policy attachment refers to a service policy 112 by reference 162. Each such service policy 112 is then checked to determine whether to grant a request to access the requested policy subject 116. In one example, each service policy 112 that is identified as being attached to the requesting subject 116 is checked to determine if access can be granted, and access is denied if one or more of the service policies 112 is not satisfied.

In one or more embodiments, Computer3 103 hosts a policy manager user interface 134, which displays information about at least one service policy 136 based on the policies 112 stored in the repository 110, and policy subject 138 based on the subjects 116 stored in the repository 110, as well zero or more policy sets 142. In one aspect, the term "policy set" refers to an XML document, XML element, or Java® programming language class that describes global policy attachments. Inside a policy set is a reference to one or more policies. A global policy attachment can be understood as the combination of a policy set describing a type and scope of subjects and the policy that it references. In one or more embodiments, a policy set is a representation of a global policy attachment stored on a storage medium such as a disk and/or a computer memory. Although the term "policy set" may imply a set of policies, a policy set 142 does not necessarily include more than one policy. Instead, a policy set 142, like a global policy attachment 160, includes references to policies 112, a policy attachment scope 164, and other attributes. The policy attachment scope 164 can associate the policy set 142 with multiple subjects 116, so creating a policy set 142 may be understood as establishing an association between a policy 112 and a set of one or more subjects 116.

In one or more embodiments, the policy manager 106, in response to instructions from the policy manager user interface 134 or other interface, creates, modifies, and deletes policies 136. The policy manager user interface 134 is also linked to a global policy attachment user interface 146, which allows users, e.g., system administrators, to create, modify, and delete policy sets 142. The user interfaces 134, 146 can execute on a client computer 103, e.g., in a web browser that downloads web pages and/or program code that implements the user interface 134 from the server computer 101. The user interfaces 134, 146 may be graphical user interfaces (GUIs) displayed on a screen of the client computer 103, the server computer 101, or other device, configured to present information about policies 136, subjects 138, policy sets 142, and other related information. In one example, the global policy attachment user interface 146 enables users to create policy sets 142 by selecting a policy 136, and then defining one or more attribute values of the specification 160, such as a desired type and scope. The user interface 146 may also provide features for deleting and updating global policy attachments, e.g., by changing the policy 136 or attributes of a global policy attachment 160.

In accordance with one or more embodiments, the policy attachment metadata 114 is used by the application server 144 to store the direct policy attachments 118 and the global policy attachments 160 created by users or administrators. That is, the policy attachment metadata 114 may be understood, in one aspect, as a representation of the direct policy attachments 118 and the global policy attachments 160.

By attaching policies 112 to a set of subjects 116 by type, an administrator can be sure that all subjects are secured by default independent of, and prior to, deployment. The administrator can, for example, define a global policy attachment 160 that attaches a security policy 112 to all Web service endpoints in a domain. In this case, any new Web services that are subsequently added to the domain will automatically inherit the security configuration defined in the global policy attachment. In one aspect, a subject 116 is considered secure if the policies attached to it (either directly or globally) enforce authentication, authorization, and/or message protection behaviors. A disabled policy or a disabled assertion within a policy does not enforce authentication, authorization, or message protection. Security of a subject 116 can be disabled by attaching an enabled policy that contains an assertion, with the relevant category, that explicitly does not do anything. For example, "no behavior" assertions are provided for each category, and these assertions can be included in a policy to disable security for subjects attached to that policy.

Scenarios in which attaching policies globally can be useful include, for example, when many or all subjects 116 of a given type need to be protected with the same set of policies 112, and each subject 116 uses the policies' default configuration. For example, if all services in a domain need to be protected with authentication (using SAML or Username token policies) and WSS11 message protection, a global policy attachment 160 can be created to attach the appropriate policy to all services in the domain.

In another example, a subset of policy subjects 116 are to be protected with the same set of policies 112, but these policies 112 are different from the domain-wide default. For example, all services need to be protected with authentication (using SAML or Username token), but the General Ledger application also needs stronger WSS11 message protection. One global policy attachment 160 can be created to attach an authentication policy to all services, and a second global policy attachment 160 can be created to attach the stronger message protection policy to the General Ledger application.

In another example, a single subject 116 is to be protected by a policy in a category that is not already covered by the existing set of global policy attachments 160. In this example, a sensitive financials-based service endpoint requires permission for a client to access it in addition to the authentication and message protection required. In this case, a direct attachment specification 118 can be used to directly attach the authorization policy to the financials-based service endpoint. The direct attachment 118 is combined with the policies attached by the global policy attachment 160, and both the directly-attached and globally-attached policies are enforced.

Subjects and attributes of global policy attachment 160 are ordinarily represented as strings of characters such as "Server1" or "Security". In one aspect, two strings match if they contain the same characters, or if one includes a wildcard character and the non-wildcard portions of the string are the same as the corresponding characters of the other string. For example, the string "Serv*1" matches any string that begins with "Serv" and ends with "1", such as "Server1" and "Service1." Thus, a subject with the attribute type="Security" matches a global policy attachment that has an attribute named "type" with the value "Security" and does not match a global policy attachment that has a type attribute with the name "RM".

Figure 4:
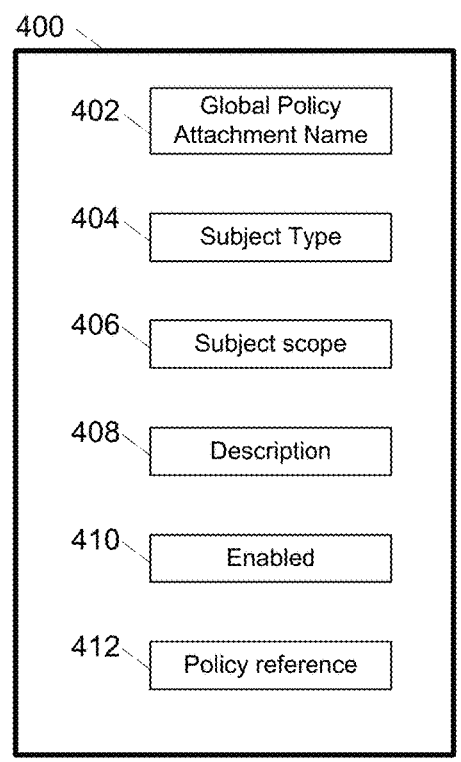
FIG. 4 is a simplified block diagram of a global policy attachment 400 according to an embodiment of the present invention.

The attributes of a global policy attachment 160 can include, for example, the type of subject, e.g., web service client, as described above, and the scope 164 of policy, which refers to a level of the enterprise system at which the desired policy is attached, e.g., "domain" for an entire enterprise system, "application" for a particular application, and the like. For example, a scope "domain=D1" specifies the management domain named D1, which includes the servers, applications, and other entities that are members of domain D1. The scope D1 is said to "include" the particular domain instance D1 and the levels below D1 in the hierarchy. That is, domain=D1 matches the domain D1 and contains the scopes of the levels below D1. The attributes of a policy in one or more embodiments are shown in FIG. 4. The attributes of the global policy attachment 160 can be specified with wildcards, e.g., an asterisk (*) character, to indicate that any subject attribute that matches the wildcard will be acceptable as a match for the particular policy.

For example, a desired scope of "Domain=*" indicates that a subject having any scope is acceptable, assuming that any other desired attributes also match. As another example, a desired scope of Domain="Production*" and Application="Banking" indicates that a subject is acceptable if the subject's Domain attribute begins with the word "Production" and the subject's Application attribute is "Banking." In one aspect, the wildcard character is an asterisk (*), which matches any string of zero or more characters.

Figure 2A:
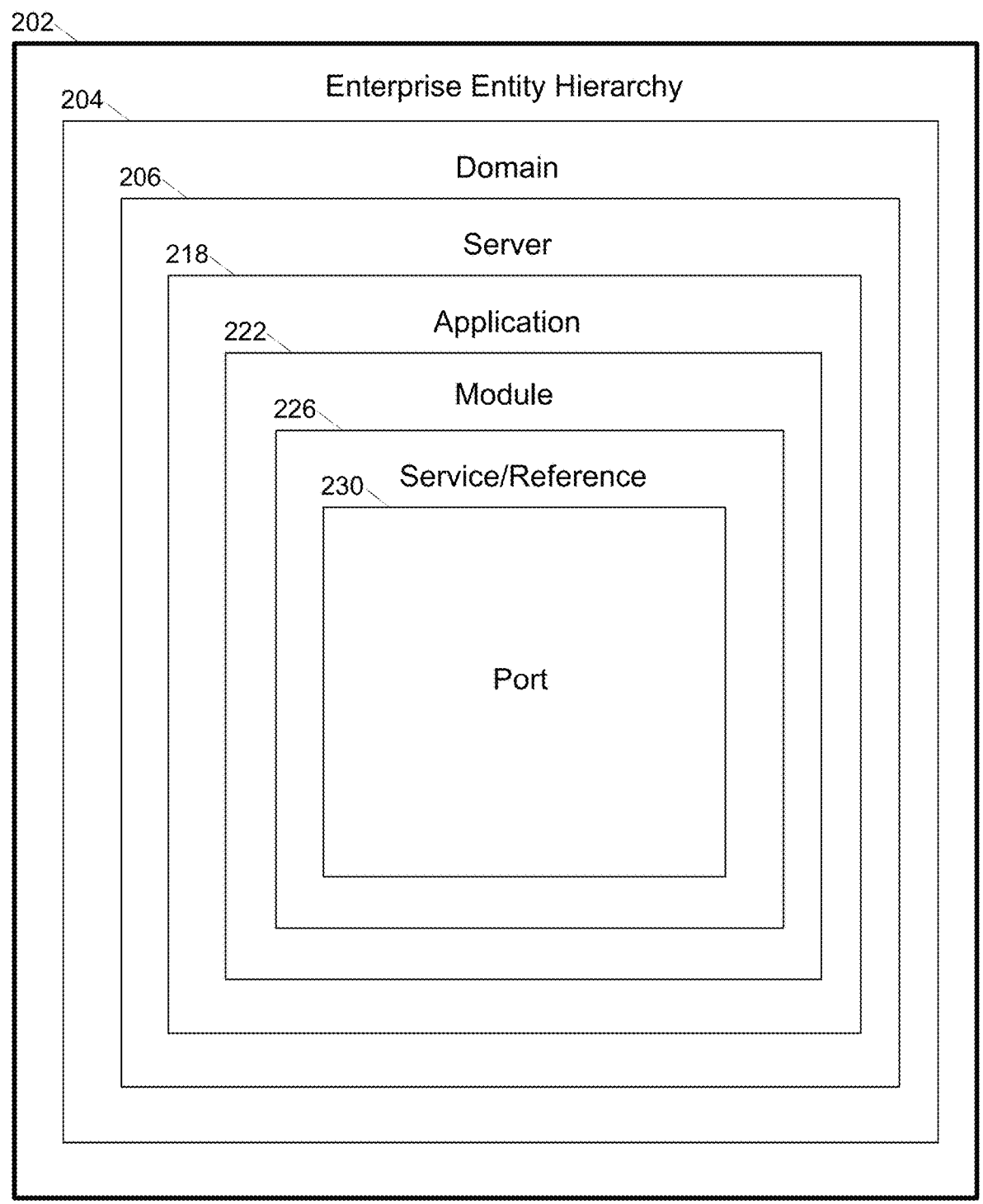
FIGS. 2A and 2B are a simplified block diagrams of enterprise containment hierarchies according to embodiments of the present invention.
Figure 2B:
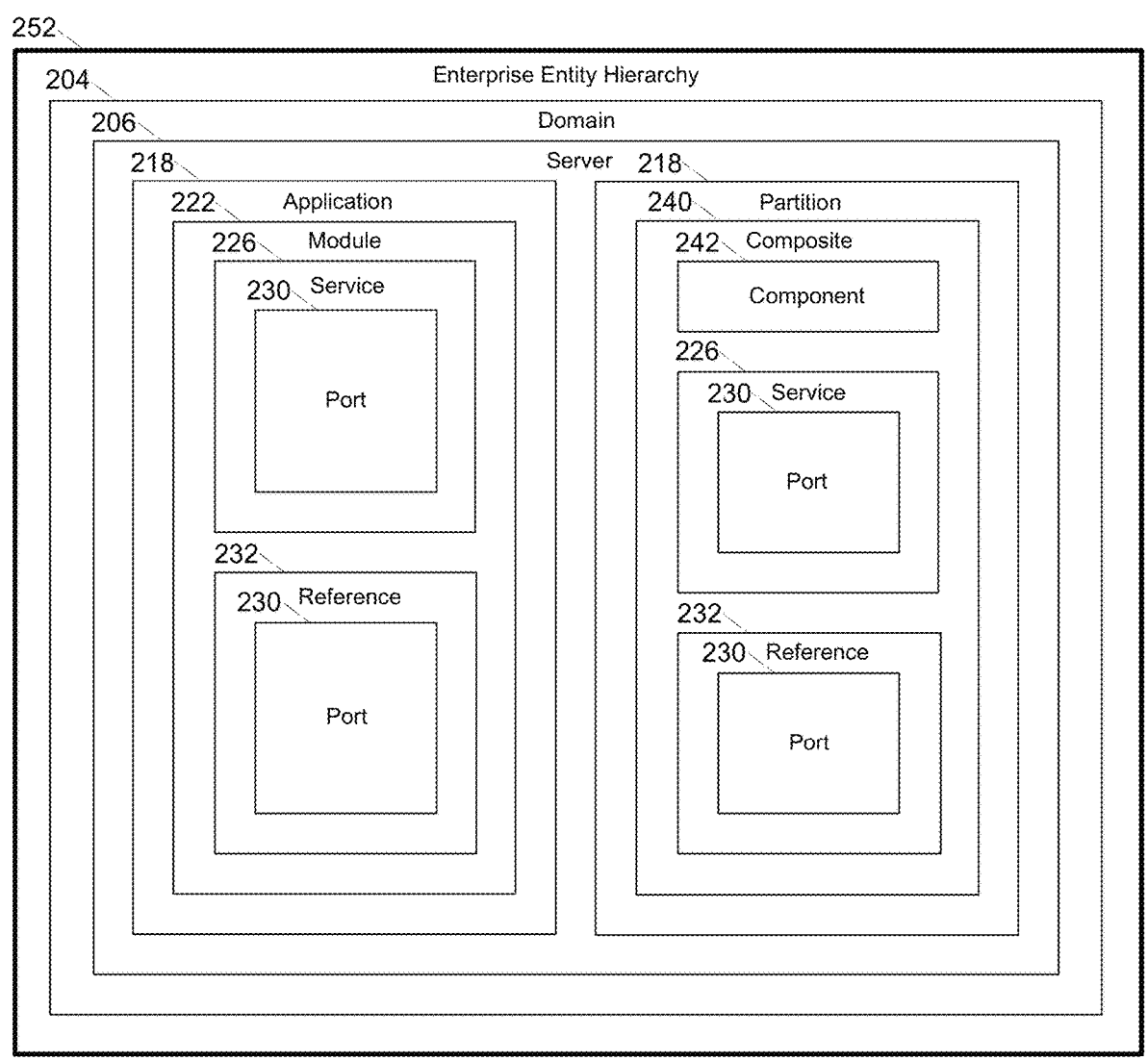

FIGS. 2A and 2B are simplified block diagrams of enterprise containment hierarchies 202, 252 according to embodiments of the present invention. Referring to FIG. 2A, the hierarchy 202 corresponds to a structure of a distributed enterprise system and provides a series of levels that correspond to entities that are used to implement enterprise applications. The levels are ordered from a highest level (Domain 204) to a lowest level (Port 230), and each level contains all the levels below it. The lowest level, Port 230, does not contain any levels. In order from highest, i.e., broadest, to lowest, i.e., narrowest, the levels are Domain 204, Server 206, Partition 218, Module 222, Service/Reference 226, and Port 230. Example scopes are listed in Table 1. It should be understood that the scopes listed in Table 1 are examples of the scopes that may be used, and more or fewer scopes may be used in one or more embodiments. Other scopes that correspond to portions of an enterprise hierarchy can also be used in place of or in addition to scopes listed in Table 1.

TABLE 1

| Scope | Description |
| --- | --- |
| Domain | System management entity that can include multiple servers |

TABLE 1-continued

| Scope | Description |
| --- | --- |
| Server instance | Server computer system that hosts applications |
| Application | An enterprise application |
| Application Module | A component of an enterprise application, e.g., a SOA composite application |
| Service/Reference | Web service interface/web service client interface |
| Port | Communication endpoint |

FIG. 2B illustrates an enterprise containment hierarchy 252 according to embodiments of the present invention. As shown in the hierarchy 252, the Service level 226 and a Reference level 232 corresponds to two scopes that exist at the same level in two separate scope hierarchies. The two separate scope hierarchies differ starting in the application module 218. A module level 222 corresponds to the first scope hierarchy, and a Composite level 240 corresponds to the second scope hierarchy. The second scope hierarchy may represent, for example, a Service Oriented Architecture (SOA) hierarchy, in which the Composite level 240 may correspond to a SOA Composite, such as a Composite application. The Composite level 240 contains three members at the same level, including a Component level 242, a Service level 226, and a Reference level 232, which may correspond to SOA components, SOA Services, and SOA References, respectively. The Service levels 226 and the Reference levels 232 include Port levels 230, which can correspond to, for example, communication ports in the module hierarchy 226, or SOA communication ports in the Composite hierarchy 240. Other hierarchies are possible, using different levels than those shown here. The example hierarchies 202, 252 are shown for illustrative purposes, and other levels and/or structures are possible.

Service policies 112 can be attached to each level of the hierarchy 202 (or the hierarchy 252) to specify Quality of Service needs for that level and the levels below it. That is, since the levels are in a containment hierarchy, the policy specified at a particular level applies to that level and to all levels contained in that level, unless the policy is "overridden" by a different policy attached to one of the lower levels. In one or more embodiments, a globally attached policy can be overridden by attaching a policy containing assertions with the same categories either by direct attachment or by global attachment at a lower scope.

As an example, a policy that performs user authentication can be attached at the Domain level 204 to a domain named "Domain1" to specify that all entities in that domain, i.e., all ports, all services/references, all modules, all applications on all servers of the domain Domain1 should use that user authentication policy. That is, the entities with the domain "Domain1" on all levels below the domain level 204 "inherit" the policies. Further, an authorization (i.e., access control) policy can be attached to an application named "App1" at the application level 218 to specify that all entities of App1, i.e., all modules, services/references, and ports, should use that authorization policy. If the authorization policy can co-exist with the authentication policy attached to Domain1, then both policies will be attached to "App1" and its entities. If a policy that conflicts with the Domain1 authentication policy, e.g., a second authentication policy that specifies a different type of authentication, is attached at a level below Domain1, e.g., at the module 222 level to a module named "Module1", then all entities in Module1 will use the different type of authentication, but other modules and entities at levels above Module1, e.g., servers 206 and applications 218, will not use the second authentication policy. That is, if a policy attached at a lower level conflicts with a policy attached at a higher level, then the policy attached at the lower level overrides the higher-level policy for entities at the lower level and below. To disable a globally attached policy for a specific endpoint or range of endpoints, predefined "null" policies that do not enforce any behavior can be attached at a specific level. Attaching a null policy to a specific entity disables the behavior of policies attached at higher scopes.

In one example, a global policy attachment 160 includes the following information: a name, e.g., "all-domains-default-web-service-policies", a resource type, e.g., "Web Service Endpoint", a resource scope, e.g., "Domain('jrfServer_domain')", a description, e.g., "Global policy attachments for Web Service Endpoint resources", an enabled (i.e., status) flag, which can be true or false, and one or more policy references, which refer to particular policies and indicate whether the policies are enabled, e.g., "security: oracle/saml, enabled". In one example, global policy attachments 160 are stored as XML documents in the repository 110 under the /policysets/global directory. Further, the effective policies generator 126 checks the enabled flag, and removes policy sets that have the enabled flag set to false from the effective policies 128. Other hierarchies are possible, e.g., with different levels or different numbers of levels, and the hierarchies of FIGS. 2A and 2B are examples of possible hierarchies.

Figure 3:
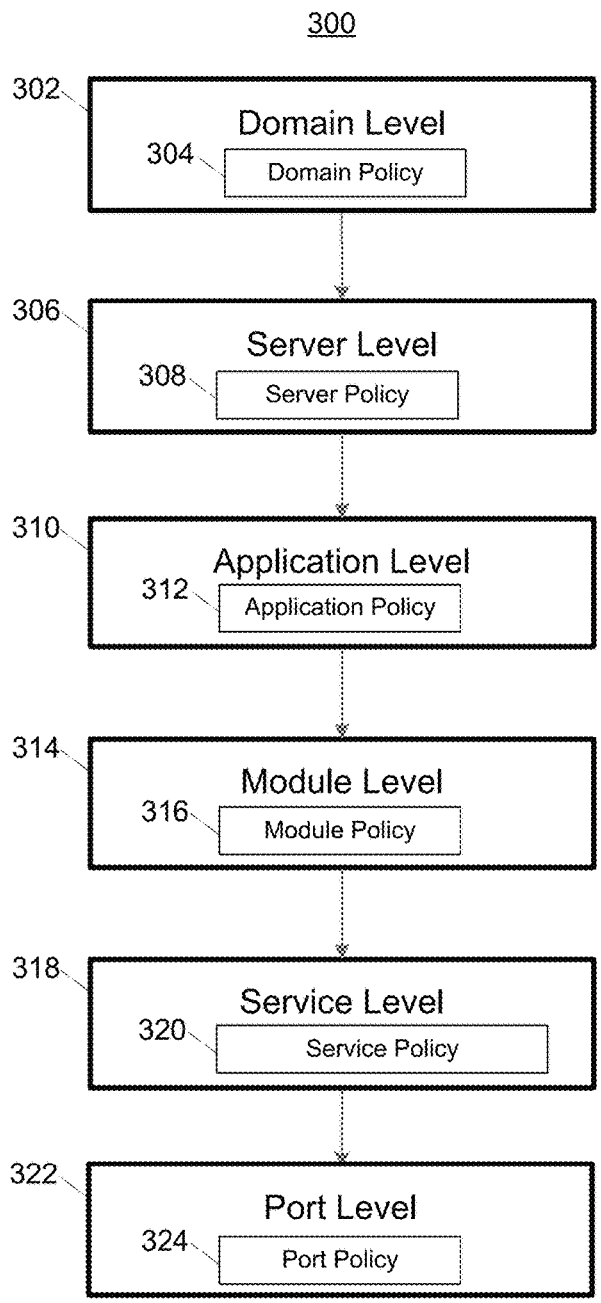
FIG. 3 is a simplified block diagram of an enterprise containment policy hierarchy 300 according to an embodiment of the present invention.

FIG. 3 is a simplified block diagram of an enterprise containment policy hierarchy 300 according to an embodiment of the present invention. The hierarchy 300 is shown in FIG. 3 as a sequence of levels, starting at a top level, referred to herein as a domain level 302, to which a domain policy 304 can be attached by a global policy attachment specification 160. The domain level 302 contains a server level 306, to which a server policy 308 can be attached. The server level 306 contains an application level 310, to which an application policy 312 can be attached. The application level 310 contains a module level 314 to which a module policy 316 can be attached. The module level 314 contains a service level 318, to which a service or reference policy 320 can be attached. The service level 318 contains a port level 322, to which a port policy 324 can be attached. In one aspect, each level contains all of the levels below it, so that, for example, the server level 306 contains the application level 310, the module level 314, the service level 318, and the port level 322. A policy attached to a particular level applies to an instance of that level and to all levels below that level, unless there is a conflict between the policy and another policy at that level or at a level below, or the policy is disabled. For example, a policy attached at the scope Module ("Banking") is attached to a module named "Banking" at the module level 314, and applies to all entities in the service level 318 and the port level 322 unless there is a conflicting policy attached to any of the module level 314, the service level 318, or the port level 322. Thus, in one aspect, levels that are lower in scope have higher precedence than levels that are higher in scope. In other embodiments different levels can be used, e.g., a network level to represent a communications network. More or fewer levels can be used, e.g., one or more of the levels shown in FIG. 3 could be removed. The precedence could be in a different direction, e.g., the level 302 could be a port level, the level 306 could be a service level, and so on, with the lowest level 322 being a domain level, in which case the level 302 at the top of the hierarchy would be the lowest in scope, and levels that are lower in the hierarchy would be higher in scope.

A scope can be specified by the scope level and the name of an instance of that scope. For example, Domain ("D1") specifies a domain instance D1 at the domain scope, Server ("S1") specifies a server instance S1 at the server scope, Application ("A1") specifies an application instance A1 at the application scope, Module ("M1") specifies a module instance M1 at the module scope, Service ("S1") specifies a service instance S1 at the service scope, and Port ("P1") specifies a port instance P1 at the port scope. A policy can be attached more specifically to particular instances at multiple levels by specifying multiple level instances, in which case the policy applies to the specified instances at the specified levels, and to lower levels absent any conflicts. For example, a policy attached to Domain ("D1") and Server ("S1") applies to all application, module, service, and port instances of the server instance "S1" of the domain instance "D1", unless a conflicting policy is attached at a level below the server level. Other hierarchies are possible, e.g., with different levels or different numbers of levels, and the hierarchy of FIG. 3 is just one example of a possible hierarchy.

FIG. 4 is a simplified block diagram of a global policy attachment 400 according to an embodiment of the present invention. The global policy attachment 400 can be understood as a set of criteria that select a set of resources to which a policy is to be "attached", i.e., associated. One or more global policy attachment 400 can be stored as, for example, documents in a repository, data structures in a computer memory, entries in a database or file system, or the like. In one or more embodiments, the global policy attachment 400 includes a global policy attachment name 402, which identifies the global policy attachment, a policy subject type 404, which identifies the type of subject or resource to which the global policy attachment applies, a subject scope 406, which identifies the subject to which the global policy attachment applies, a description 408, which can be a human-readable description of the global policy attachment, an enabled flag 410, which can be true to indicate that the global policy attachment is enabled, or false to indicate that the global policy attachment is disabled and should not be used in calculating effective global policy attachments. The global policy attachment 400 also includes a policy reference 412, which refers to the policy that the global policy attachment applies to the policy subject. The elements of the global policy attachment 400 are summarized in Table 2.

TABLE 2

| Global policy attachment | |
| --- | --- |
| Global policy attachment name | Name of global attachment specification, e.g., all-domains-default-web-service-policies |
| Subject type | Type of policy subject, e.g., Web Service Endpoint. Can be one of SOA Component, SOA Service, SOA Reference, Web Service Connection, Web Service Endpoint, Web Service Client, or Asynchronous Callback Client |

TABLE 2-continued

Global policy attachment

| | |
|---|---|
| Subject scope | Scope of policy subject, e.g., Domain("*") |
| Description | Default policies for web services in any domain |
| Enabled | True |
| Policy reference | security : oracle/wss11_saml_or_username_token_with_message_protection_service_policy, enabled=true |

In one example, the global policy attachment name 402, global policy attachment description 408, and enabled flag 410 describe the global policy attachment itself, and are not necessarily used when determining if policies match. Other attributes may be included as well, to describe the policies to be included in the set of effective policies 128.

Figure 5:
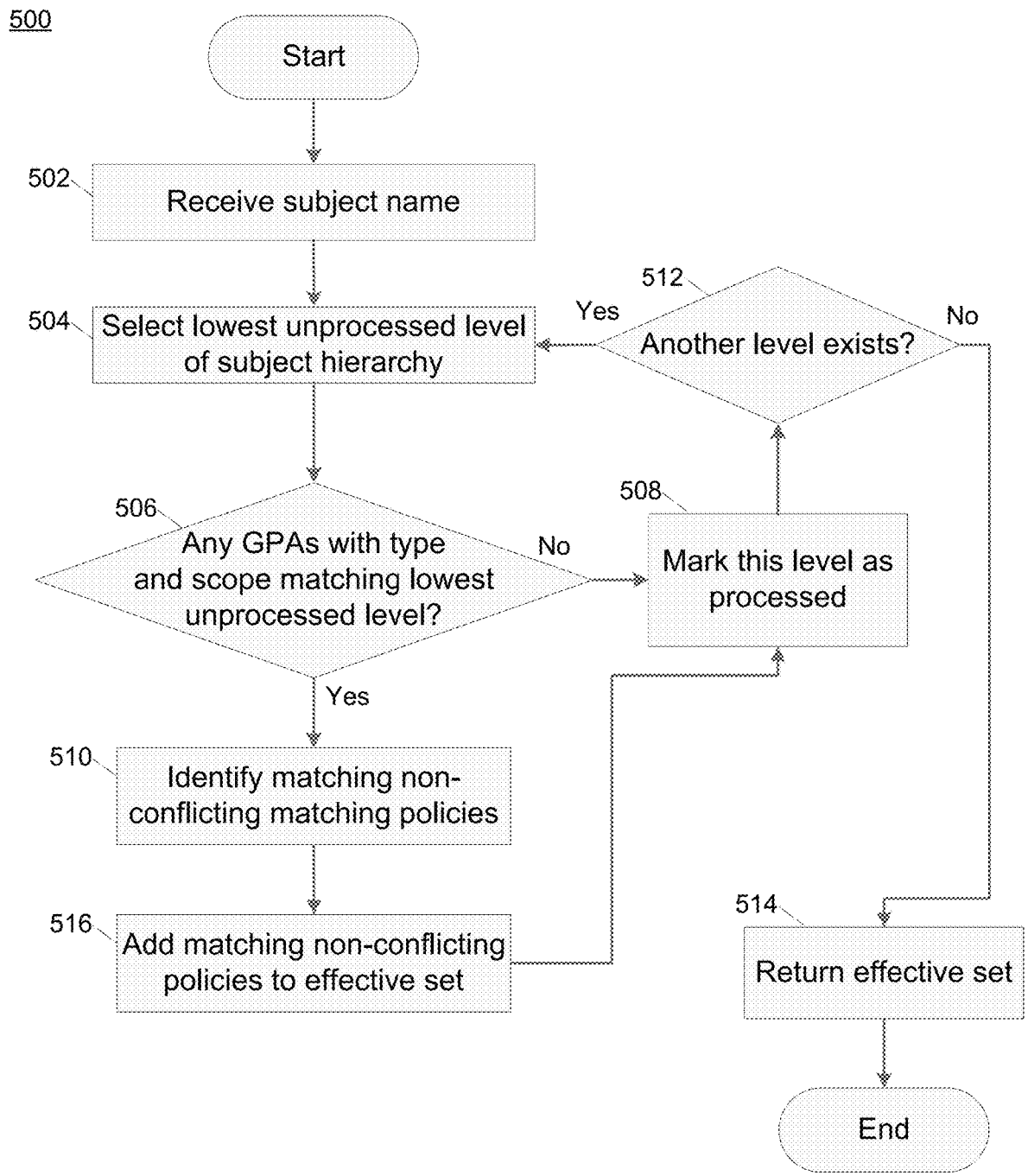
FIG. 5 is a simplified flow diagram illustrating a method for determining an effective set of policies according to an embodiment of the present invention.

FIG. 5 is a simplified flow diagram illustrating a method 500 for determining an effective set of policies according to an embodiment of the present invention. The processing depicted in FIG. 5 may be performed by software (executed by a processor), hardware, or combinations thereof. The method of FIG. 5 can be performed by, for example, the effective policies generator 126 of FIG. 1. Block 502 is invoked when a component of an application server 144, such as the policy manager 106 of FIG. 1, receives a request to access a policy subject 116 or other resource. Block 502 receives a name or identifier of the requested subject. Block 504 selects the lowest level of the resource policy hierarchy not yet processed by the current invocation of the method 500. For example, the first time that block 504 is reached for a particular invocation, the port level will be selected, and the second time the service level is selected, up through the domain level, after which there are no further levels to select.

Block 506 determines if there are any enabled global policy attachments ("GPAs") that have a type and scope matching the lowest unprocessed level selected in block 504. Block 506 may, for example, retrieve the global policy attachments 160 from the repository 110. If there are no enabled global policy attachments that match the current level, block 508 marks this level as processed and block 512 checks if there are more unprocessed levels. If so, block 512 invokes block 504 for the level above the current level. Otherwise, if block 506 identifies at least one enabled global policy attachment, then block 510 evaluates each policy referenced by the policy set referenced by the global policy attachment to determine if the policy conflicts, by category, with a policy that was already determined to be effective, i.e., a policy already in the effective set. Block 510 thus identifies non-conflicting matching policies that do not have the same category as a policy already in the effective set (e.g., do not have the same category as any of the policies placed in the effective set by previous iterations of the method 500). Block 516 adds the non-conflicting matching policies identified in block 510 to the effective set. Control then transfers to block 504 to process the next level above the current level.

In other embodiments, the matching policies that would conflict are added to the effective set, and the conflict can be resolved by some process not shown in FIG. 5, or the conflict can be allowed to exist. Otherwise, if the matching policy or policies identified in block 506 would not conflict, the matching policy or policies are added to the set of effective policies, and control transfers to block 508, which marks this level as processed. Block 512 checks if there are more unprocessed levels, and if so invokes block 504 to process the level above the current level. Otherwise, if block 512 determines that there are no more unprocessed levels, e.g., the domain level and the levels below it have been processed, then block 504 returns the effective set of policies as the result of the method, and the method ends.

Figure 6:
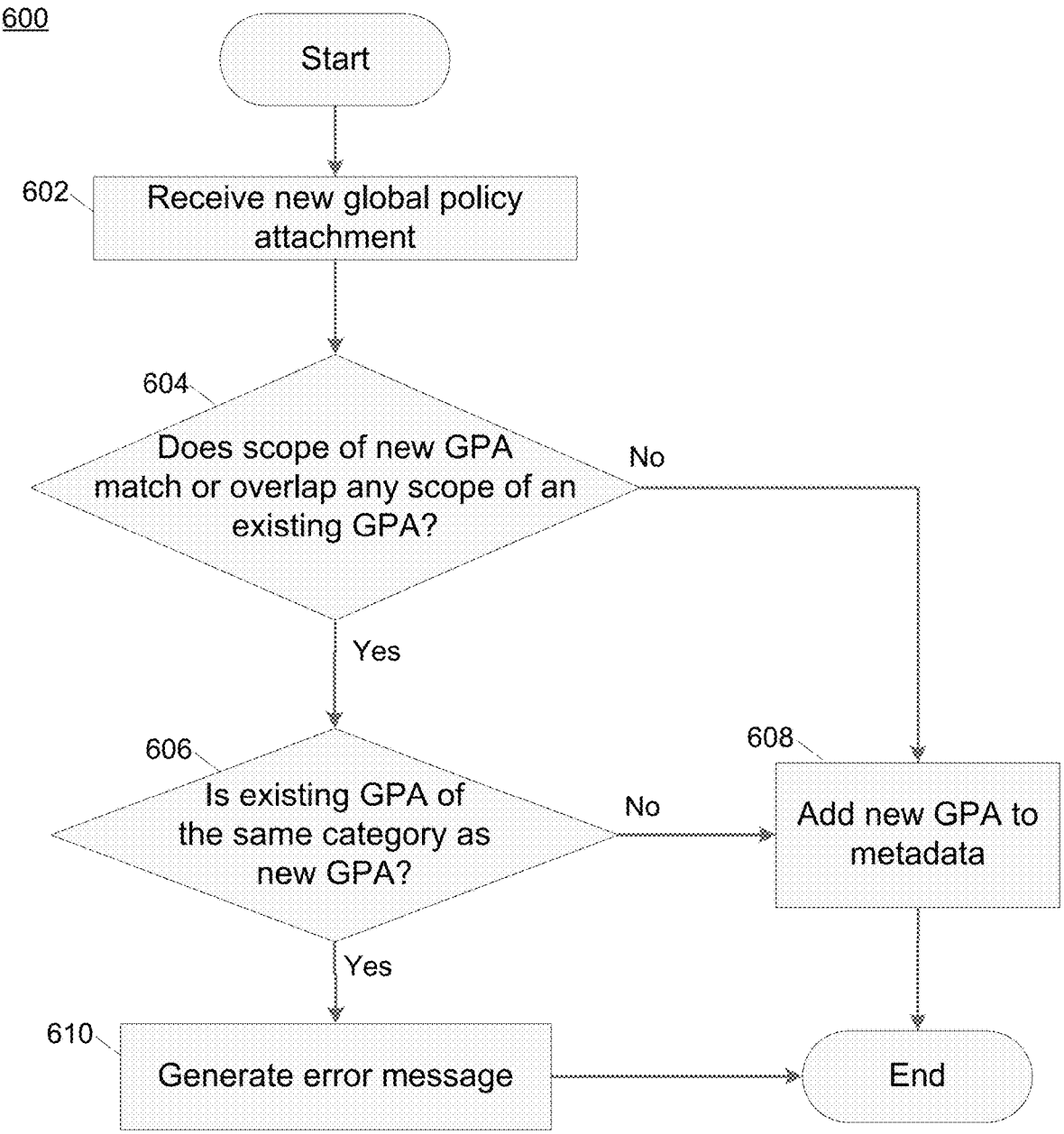
FIG. 6 is a simplified flow diagram illustrating a method of creating a new global policy attachment according to an embodiment of the present invention.

FIG. 6 is a simplified flow diagram illustrating a method 600 of creating a new global policy attachment according to an embodiment of the present invention. The processing depicted in FIG. 6 may be performed by software (executed by a processor), hardware, or combinations thereof. The method of FIG. 6 can be performed by, for example, the global policy attachment user interface 146 of FIG. 1. Block 602 is invoked when a new global policy attachment is created. Block 604 determines if the scope referenced by the new global policy attachment ("GPA") can match or overlap with any scope of an existing global policy attachment. This determination involves checking if multiple wildcard scopes overlap, e.g., CRM* and C*1 can overlap. If the new scope does not match or overlap with any existing scope, block 608 adds the new global policy attachment to the repository 110 in the global policy attachments 160. Otherwise, if the new GPAs scope can match or overlap with the scope of an existing GPA, then block 606 determines if there is an existing global policy attachment of the same category as the new global policy attachment. If so, block 610 generates a warning (or, alternatively, an error message) to indicate to the user that the new global policy attachment cannot be created. In other embodiments, block 610 can add the new global policy attachment as in block 608, and the conflict can be resolved using appropriate criteria, or an error message can be generated at a later time.

FIGS. 7-11 illustrate global policy attachment user interfaces that can be used in accordance with embodiments of the invention. Referring to FIG. 7, a global policy attachment user interface 700 corresponds, in one example, to the global policy attachment user interface 146 of FIG. 1. As introduced above, policy sets 142 can be used to represent global policy attachments 160, and can be used to attach policies to a range of policy subjects 116 of the same type as the policy set 142. Referring to FIG. 7, a user can manage global policy attachments at the domain level from a Policy Set page 702. A user can navigate to the Policy Set Summary page 706 by selecting a domain 704 in a Navigator pane 705 on the left side of the user interface 700. A user can view, create, copy, edit, and delete policy sets from the Policy Set Summary page 706. The user can expand and select a particular domain 704 in which global policy attachments are to be managed. From a Domain menu (not shown) selected by, for example, right-clicking on the domain 704, the user can select Web Services and then Policy Sets to display the Policy Set Summary page 706. The user can then view the details of a policy set by selecting a policy set from the Policy Set Summary Page 706 and clicking a View button or link 714 to display a Policy Set Details page 802 as shown in FIG. 8.

Referring to FIG. 8, the Policy Set Details page 802 displays general information 804 about the selected policy set, including a policy set name, an enabled flag, a resource type, a description, a version number, a last update date, and a user name identifying the user who last updated the policy set. The page 802 also displays the scope 806 referenced by the policy set, which is Domain ("em_domain") in this example, and the policies 808 referenced by the policy set, which are two Security policies in this example.

To create a policy set, a user can navigate to the Policy Set Summary page 706, and click a Create button or link 710 on the Summary page 706. A Create Policy Page 902 for entering general information is then presented, as shown in FIG. 9. Referring to FIG. 9, a user can enter a name 906 and description 912 for the new policy set. The user can select an Enabled check box 908 to enable the policy set. In the Type of Resources field 910, the user can select the type of policy subject to which policies are to be attached. The types 910 of policy subjects that can be selected include SOA Component, SOA Service, SOA Reference, Web Service Connection, Web Service Endpoint, Web Service Client, and Asynchronous Callback Client. The user can then click Next 914 to continue to the Scope of Resources page 1002 shown in FIG. 10.

Referring to FIG. 10, in the Scope of Resources page 1002, the user can enter at least one string that defines the scope 1008 for the resource type 1006 that was selected in the previous step. In one or more embodiments, the following resource scopes are supported: Domain, Server Instance, Application, Application Module, and SOA Composite. Other resource scopes are possible, and these examples should not be construed as limiting the scopes that may be used to the specific scopes described. A user can specify a resource scope by entering a pattern string in at least one Pattern field 1012 on this page. The list of available resource scopes is determined by the Resource Type 1006. For example, if the user selected Web Service Endpoint, the resource scopes available are Domain, Server Instance, Application, and Application Module. For SOA resource types, examples of the resource scope types 1006 available include Domain, Server Instance, and SOA Composite.

For example, to attach the policies to all policy subjects of type Web Service endpoint in the domain, the user can enter a pattern string to represent the name of the domain only. The other fields in the scope 1008 (e.g., server instance name, application name, application module name) need not be specified. To attach the policies at a finer scope, for example at the application or application module level, the user can enter a pattern string to represent the name of the application or the module in the Pattern field 1012. An asterisk (*) can be used as a wildcard character within the pattern string 1012 to match any number of characters at the asterisk's position. Multiple wildcards can be included within the string. If the user enters only an asterisk wildcard for Domain, the scope level will affect all domains in the enterprise. If the user provides a pattern string for multiple resource scopes, such as Domain Name and Server Instance Name, the filtering conditions are combined together. For example, the pattern strings "myDomain*" for the Domain Name and "*SOA*" for the Server Instance Name attach policies having policy scopes that match both of the pattern strings, e.g., Domain="myDomain*" and Server="*SOA*". The user can then click a Next button 1010 to proceed to add a policy reference to the policy set.

Figure 11:
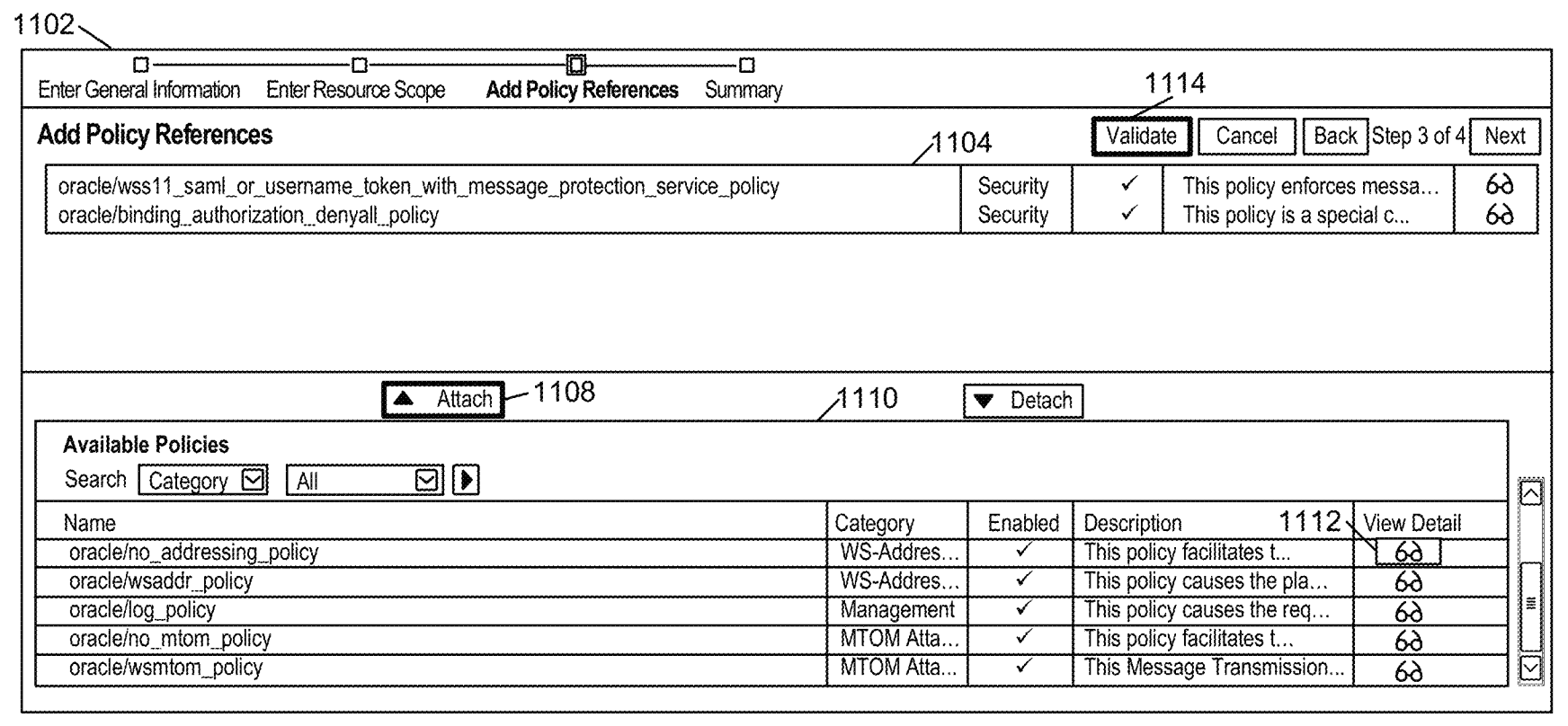

Referring to FIG. 11, an Add Policy References Page 1102 displays a list 1104 of policies that have previously been added to the policy set. A user can select a policy from the Available Policies list 1110, and click Attach 1108 to cause the selected policy to be added to the policy set. To view details about a policy, a user can select the policy and click a View Detail icon 1112. A pop-up window (not shown) then provides a read-only description of the policy and lists the assertions that the policy contains. The user can continue selecting and attaching additional policies. When finished, the user can click a Validate button 1114 to verify that the combination of selected policies is valid.

In one or more embodiments, to explicitly disable a globally attached policy for specific subjects, predefined policies that do not enforce any behavior can be attached to those subjects. A user can disable a globally attached policy by attaching one of these predefined null policies that contains the same category of assertions as the policy to be disabled. Examples of categories include Security, Reliable Messaging (RM), MTOM, or Addressing. Other categories are possible, and these examples should not be construed as limiting the categories that may be used to the specific categories described. A user can attach the null policy either directly to an endpoint, or globally at a lower scope, such as at the application or module level. As described elsewhere herein, a policy that is directly attached takes precedence over a policy that is globally attached and a policy that is globally attached at a lower scope takes precedence over a policy that is globally attached at a higher scope.

For example, if an authentication policy is globally attached to all service endpoints in a domain, a user can disable the authentication policy for a specific Web service endpoint by directly attaching the oracle/no_authentication-_service_policy to the Web service endpoint. In one or more embodiments, with reference to FIG. 2B, a direct attachment is comparable to a global policy attachment at the port 230 or SOA component scope 242 (as relevant for the type of subject). Therefore, a direct policy attachment takes precedence over a global attachment if the global attachment is at a higher scope (e.g., at the module level 222) than the direct attachment. In one example, to disable the authentication policy for only an application in the domain, a user can create a global policy attachment that attaches the oracle/ no_authentication_service_policy to the service endpoints in the application. In one example, if the globally attached policy being disabled contains any other assertions, those assertions are also disabled. For example, if the global policy to be disabled is oracle/ wss10_saml_token_with_message_protection_client_policy and the no behavior oracle/no_authentication_service-_policy is attached to an endpoint at lower scope (or directly), both the authentication and the message protection assertions of the globally attached policy are disabled.

Figure 12:
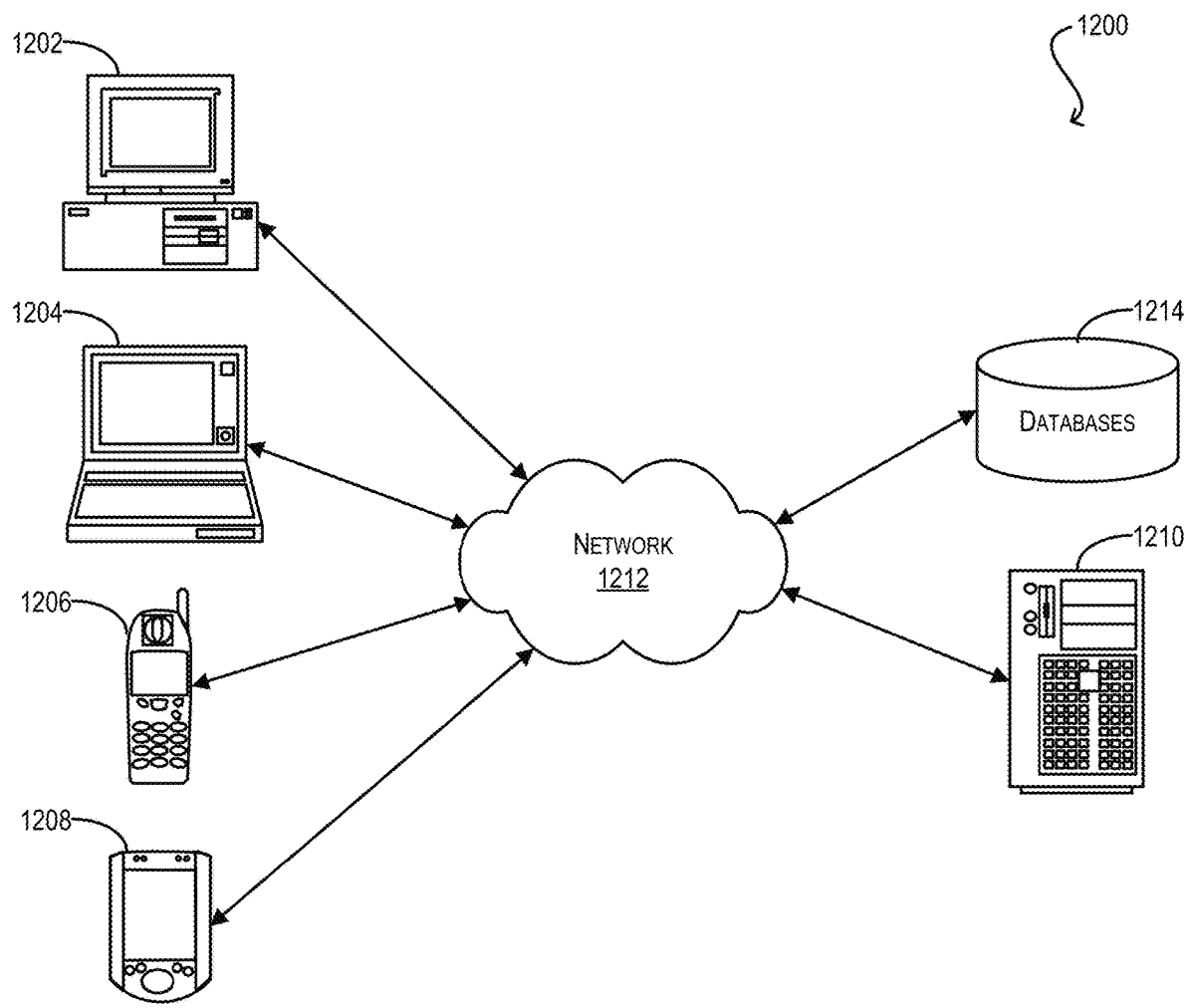
FIG. 12 is a simplified block diagram illustrating a system environment that can be used in accordance with an embodiment of the present invention.

FIG. 12 is a simplified block diagram illustrating a system environment 1200 that can be used in accordance with an embodiment of the present invention. As shown, system environment 1200 can include one or more client computing devices 1202, 1204, 1206, 1208, which can be configured to operate a client application such as a web browser, a UNIX/Solaris terminal application, and/or the like. In various embodiments, client computing devices 1202, 1204, 1206, 1208 can correspond to client 103 of FIG. 1, and can be operated by one or more users to invoke and interact with the policy manager user interface 134 and the policy manager 106.

Client computing devices 1202, 1204, 1206, 1208 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1202, 1204, 1206, 1208 can be any other electronic device capable of communicating over a network, such as network 1212 described below. Although system environment 1200 is shown with four client computing devices, it should be appreciated that any number of client computing devices can be supported.

System environment 1200 can further include a network 1212. Network 1212 can be any type of network familiar to those skilled in the art that can support data communications using a network protocol, such as TCP/IP, SNA, IPX, AppleTalk, and the like. Merely by way of example, network 1212 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1200 can further include one or more server computers 1210 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 1210 can run an operating system including any of those discussed above, as well as any commercially available server operating system. Server 1210 can also run any of a variety of server applications and/or mid-tier applications, including web servers, FTP servers, CGI servers, Java virtual machines, and the like. In one set of embodiments, server 1210 can correspond to server computer 101 of FIG. 1.

System environment 1200 can further include one or more databases 1214. In one set of embodiments, databases 1214 can include databases that are managed by server 1210. Databases 1214 can reside in a variety of locations. By way of example, databases 1214 can reside on a storage medium local to (and/or resident in) one or more of computers 1202, 1204, 1206, 1208, and 1210. Alternatively, databases 1214 can be remote from any or all of computers 1202, 1204, 1206, 1208, and 1210, and/or in communication (e.g., via network 1212) with one or more of these. In one set of embodiments, databases 1214 can reside in a storage-area network (SAN) familiar to those skilled in the art.

Figure 13:
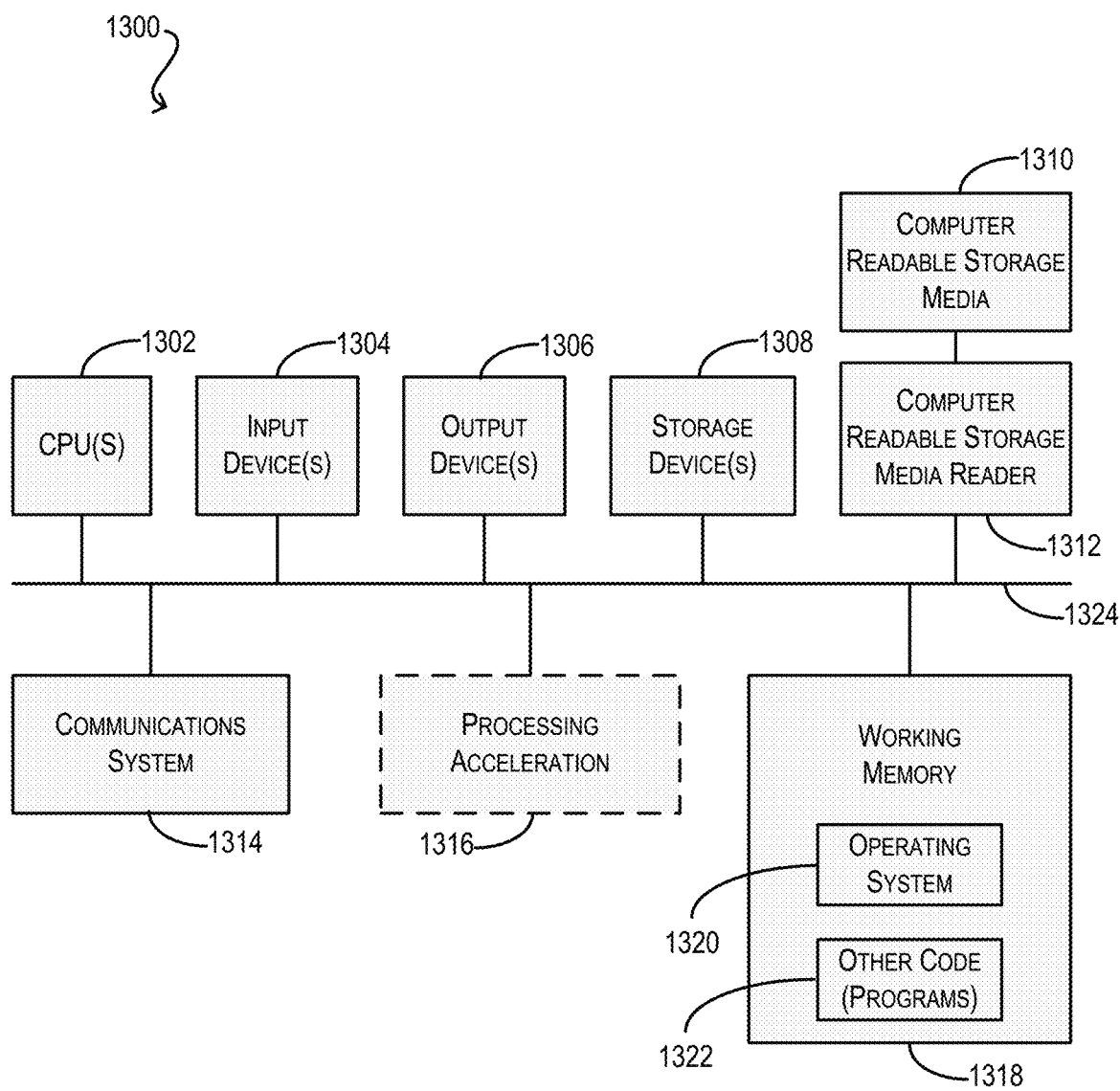
FIG. 13 is a simplified block diagram illustrating a computer system that can be used in accordance with an embodiment of the present invention.

FIG. 13 is a simplified block diagram illustrating a computer system 1300 that can be used in accordance with an embodiment of the present invention. In various embodiments, computer system 1300 can be used to implement any of computers 1202, 1204, 1206, 1208, and 1210 described with respect to system environment 1200 above. As shown, computer system 1300 can include hardware elements that are electrically coupled via a bus 1324. The hardware elements can include one or more central processing units (CPUs) 1302, one or more input devices 1304 (e.g., a mouse, a keyboard, etc.), and one or more output devices 1306 (e.g., a display device, a printer, etc.). Computer system 1300 can also include one or more storage devices 1308. By way of example, the storage device(s) 1308 can include devices such as disk drives, optical storage devices, and solid-state storage devices such as a random access memory (RAM) and/or a read-only memory (ROM), which can be programmable, flash-updateable and/or the like.

Computer system 1300 can additionally include a computer-readable storage media reader 1312, a communications subsystem 1314 (e.g., a modem, a network card (wireless or wired), an infra-red communication device, etc.), and working memory 1318, which can include RAM and ROM devices as described above. In some embodiments, computer system 1300 can also include a processing acceleration unit 1316, which can include a digital signal processor (DSP), a special-purpose processor, and/or the like.

Computer-readable storage media reader 1312 can be connected to a computer-readable storage medium 1310, together (and, optionally, in combination with storage device(s) 1308) comprehensively representing remote, local, fixed, and/or removable storage devices plus storage media for temporarily and/or more permanently containing computer-readable information. Communications system 1314 can permit data to be exchanged with network 1212 and/or any other computer described above with respect to system environment 1200.

Computer system 1300 can also comprise software elements, shown as being currently located within working memory 1318, including an operating system 1320 and/or other code 1322, such as an application program (which may be a client application, Web browser, middle tier/server application, etc.). It should be appreciated that alternative embodiments of computer system 1300 can have numerous variations from that described above. For example, customized hardware can be used and particular elements can be implemented in hardware, software, or both. Further, connection to other computing devices such as network input/output devices can be employed.

Computer readable storage media 1310 for containing code, or portions of code, executable by computer system 1300 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method for enforcing service policies in an enterprise, the method comprising:
   receiving, by a computer system, at least one attribute value describing an arbitrary set of policy subjects for a first global policy set having subject attribute values that match the at least one attribute value;
   generating, by the computer system, the first global policy set that specifies a first policy attachment and a plurality of service policies, the first policy attachment identifying a plurality of policy attachment attributes of one or more resources in the enterprise, the plurality of policy attachment attributes comprising the at least one attribute value, and the first global policy set defining an automatic assignment of the plurality of service policies to any of the one or more resources in the enterprise having resource attributes that match the plurality of policy attachment attributes, wherein:
      a first policy attachment attribute of the plurality of policy attachment attributes identified in the first policy attachment is a first policy attachment scope, the first policy attachment scope identifying one or more levels in a containment hierarchy of the enterprise, and
      a second policy attachment attribute of the plurality of policy attachment attributes identified in the first policy attachment is a first policy attachment type, the first policy attachment type identifying a defined type of resource assigned to a subset of the one or more resources in the enterprise;
   receiving, by the computer system, a request to access a first resource of the one or more resources in the enterprise;
   determining, by the computer system, that the plurality of service policies are effective policies in an effective set of policies for the first resource using the first global policy set at least in part by determining that the first policy attachment scope matches or contains a resource scope of the first resource and the first policy attachment type matches or includes a resource type of the first resource; and
   controlling, by the computer system, access to the first resource responsive to the request using the effective set of policies.

2. The method of claim 1, further comprising:
   generating, by the computer system, a second global policy set that specifies a second policy attachment and a second plurality of service policies, the second policy attachment identifying a second plurality of policy attachment attributes of the one or more resources in the enterprise, and the second global policy set attachment an automatic assignment of the second plurality of service policies to any of the one or more resources in the enterprise having resource attributes that match matches the second plurality of policy attachment attributes, wherein:
      a third policy attachment attribute of the second plurality of policy attachment attributes is a second policy attachment scope, the second policy attachment scope identifying a broader level in the containment hierarchy of the enterprise than the first policy attachment scope; and
   determining, by the computer system, that a first service policy of the second plurality of service policies is not an effective policy in the effective set of policies for the first resource at least in part by:
      determining that a category of the first service policy matches a category of a second service policy of the plurality of service policies in the first global policy set;
      determining that the first policy attachment scope matches or contains the resource scope;
      determining that the second policy attachment scope matches or contains the resource scope; and
      determining that the first policy attachment scope is associated with a narrower level of the containment hierarchy than the second policy attachment scope.

3. The method of claim 1, wherein at least one policy attachment attribute of the plurality of policy attachment attributes in the first policy attachment includes at least one wildcard, and the at least one policy attachment attribute matches or contains an attribute of the first resource if the wildcard matches the attribute of the first resource.

4. The method of claim 2, wherein the second service policy is a null policy that disables a behavior of the first service policy.

5. The method of claim 1, further comprising:
   determining, by the computer system, that a second plurality of service policies are effective policies in the effective set of policies at least in part by:
      identifying the second plurality of service policies in a second global policy set, wherein the second global policy set specifies a second policy attachment scope, and wherein the second policy attachment scope matches or contains the resource scope.

6. The method of claim 5, wherein:
   a first service policy of the plurality of services policies in the first global policy set is associated with a first policy category,
   a second service policy of the second plurality of service policies in the second global policy set is associated with a second policy category, and
   the second service policy is one of the effective policies in the effective set of policies if the second policy attachment scope matches or contains the resource scope and the first policy category is different from the second policy category.

7. The method of claim 5, wherein the first policy attachment scope has a first scope name that includes a first plurality of level names and the second policy attachment scope has a second scope name that includes a second plurality of level names,
   wherein the first policy attachment scope contains the second policy attachment scope if the first scope name includes fewer level names than the second scope name, and the second plurality of level names includes the first plurality of level names in the same order and position that level names appear in the first plurality of level names, or if the first scope name includes more level names than the second scope name and any additional level names in the first scope name are wildcards that match any name.

8. The method of claim 5, wherein:
   the first policy attachment scope has a first scope name that includes a first plurality of level names and the second policy attachment scope has a second scope name that includes a second plurality of level names, and
   the first policy attachment scope matches the second policy attachment scope if the second policy attachment scope includes a level name that equals or matches each level name in the first policy attachment scope by wildcard matching.

9. The method of claim 1, wherein the containment hierarchy comprises a plurality of levels ordered by breadth from a broad level to a narrow level, where each level contains all narrower levels.

10. The method of claim 2, wherein the request is granted if one or more assertions included in the plurality of service policies are satisfied.

11. A system comprising:
a processor; and
a memory storing a set of instructions that, when executed by the processor, cause the processor to:
receive at least one attribute value describing an arbitrary set of policy subjects for a first global policy set having subject attribute values that match the at least one attribute value;
generate the first global policy set that specifies a first policy attachment and a plurality of service policies, the first policy attachment identifying a plurality of policy attachment attributes of one or more resources in an enterprise, the plurality of policy attachment attributes comprising the at least one attribute value, and the first global policy set defining an automatic assignment of the plurality of service policies to any of the one or more resources in the enterprise having resource attributes that match the plurality of policy attachment attributes, wherein:
a first policy attachment attribute of the plurality of policy attachment attributes identified in the first policy attachment is a first policy attachment scope, the first policy attachment scope identifying one or more levels in a containment hierarchy of the enterprise, and
a second policy attachment attribute of the plurality of policy attachment attributes identified in the first policy attachment is a first policy attachment type, the first policy attachment type identifying a defined type of resource assigned to a subset of the one or more resources in the enterprise;
receive a request to access a first resource of the one or more resources in the enterprise;
determine that the plurality of service policies are effective policies policy in an effective set of policies for the first resource using the first global policy set at least in part by determining that the first policy attachment scope matches or contains a resource scope of the first resource and the first policy attachment type matches or includes a resource type of the first resource; and
control access to the first resource responsive to the request using the effective set of policies.

12. The system of claim 11, wherein the instructions comprise further instructions that, when executed by the processor, cause the processor to:
generate a second global policy set that specifies a second policy attachment and a second plurality of service policies, the second policy attachment identifying a second plurality of policy attachment attributes of the one or more resources in the enterprise, and the second global policy set defining an automatic assignment of the second plurality of service policies to any of the one or more resources in the enterprise having resource attributes that match the second plurality of policy attachment attributes, wherein:
a third policy attachment attribute of the second plurality of policy attachment attributes is a second policy attachment scope, the second policy attachment scope identifying a broader level in the containment hierarchy of the enterprise than the first policy attachment scope; and
determine that a first service policy of the second plurality of service policies is not an effective policy in the effective set of policies for the first resource at least in part by:
determining that a category of the first service policy matches a category of a second service policy of the plurality of service policies in the first global policy set;
determining that the first policy attachment scope matches or contains the resource scope;
determining that the second policy attachment scope matches or contains the resource scope; and
determining that the first policy attachment scope is associated with a narrower level of the containment hierarchy than the second policy attachment scope.

13. The system of claim 11, wherein at least one policy attachment attribute of the plurality of policy attachment attributes in the first policy attachment includes at least one wildcard, and the at least one policy attachment attribute matches or contains an attribute of the first resource if the wildcard matches the attribute of the first resource.

14. The system of claim 12, wherein the second service policy is a null policy that disables a behavior of the first service policy.

15. The system of claim 11, wherein the memory has stored thereon further instructions that, when executed by the processor, cause the processor to:
determine that a second plurality of service policies are effective policies in the effective set of policies at least in part by:
identifying the second plurality of service policies in a second global policy set, wherein the second global policy set specifies a second policy attachment scope, and wherein the second policy attachment scope matches or contains the resource scope.

16. The system of claim 15, wherein:
a first service policy of the plurality of services policies in the first global policy set is associated with a first policy category,
a second service policy of the second plurality of service policies in the second global policy set is associated with a second policy category, and
the second service policy is one of the effective policies in the effective set of policies if the second policy attachment scope matches or contains the resource scope and the first policy category is different from the second policy category.

17. A non-transitory machine-readable memory device having stored thereon a series of instructions which, when executed by a processor, cause the processor to:
receive at least one attribute value describing an arbitrary set of policy subjects for a first global policy set having subject attribute values that match the at least one attribute value;
generate the first global policy set that specifies a first policy attachment and a plurality of service policies, the first policy attachment identifying a plurality of policy attachment attributes of one or more resources in an enterprise, the plurality of policy attachment attributes comprising the at least one attribute value, and the first global policy set defining an automatic assignment of the plurality of service policies to any of the one or more resources in the enterprise having resource attributes that match the plurality of policy attachment attributes, wherein:
a first policy attachment attribute of the plurality of policy attachment attributes identified in the first policy attachment is a first policy attachment scope, the first policy attachment scope identifying one or more levels in a containment hierarchy of the enterprise, and a second policy attachment attribute of the plurality of policy attachment attributes identified in the first policy attachment is a first policy attachment type, the first policy attachment type identifying a defined type of resource assigned to a subset of the one or more resources in the enterprise;

receive a request to access a first resource of the one or more resources in the enterprise;

determine that the service policies are effective policies in an effective set of policies for the first resource using the first global policy set at least in part by determining that the first policy attachment scope matches or contains a resource scope of the first resource and the first policy attachment type matches or includes a resource type of the first resource; and control access to the first resource responsive to the request using the effective set of policies.

18. The non-transitory machine-readable memory device of claim 17, wherein the series of instructions comprise further instructions that, when executed by the processor, cause the processor to:

generate a second global policy set that specifies a second policy attachment and a second plurality of service policies, the second policy attachment identifying a second plurality of policy attachment attributes of the one or more resources in the enterprise, and the second global policy set defining an automatic assignment of the second plurality of service policies to any of the one or more resources in the enterprise having resource attributes that match the second plurality of policy attachment attributes, wherein:

a third policy attachment attribute of the second plurality of policy attachment attributes is a second policy attachment scope, the second policy attachment scope identifying a broader level in the containment hierarchy of the enterprise than the first policy attachment scope; and determine that a first service policy of the second plurality of service policies is not an effective policy in the effective set of policies for the first resource at least in part by:

determining that a category of the first service policy matches a category of a second service policy of the plurality of service policies in the first global policy set;

determining that the first policy attachment scope matches or contains the resource scope;

determining that the second policy attachment scope matches or contains the resource scope; and determining that the first policy attachment scope is associated with a narrower level of the containment hierarchy than the second policy attachment scope.

19. The non-transitory machine-readable memory device of claim 17, wherein at least one policy attachment attribute of the plurality of policy attachment attributes in the first policy attachment includes at least one wildcard, and the at least one policy attachment attribute matches or contains an attribute of the first resource if the wildcard matches the attribute of the first resource.

\* \* \* \* \*

UNITED STATES PATENT AND TRADEMARK OFFICE
CERTIFICATE OF CORRECTION

PATENT NO. : 10,791,145 B2  
APPLICATION NO. : 15/408760  
DATED : September 29, 2009  
INVENTOR(S) : Bryan et al.

Page 1 of 1

It is certified that error appears in the above-identified patent and that said Letters Patent is hereby corrected as shown below:

In the Specification

In Column 1, Line 33, delete "System" and insert -- System. --, therefor.

In the Claims

In Column 21, Lines 52-53, in Claim 2, delete "attachment" and insert -- defining --, therefor.

In Column 21, Line 56, in Claim 2, before "the" delete "matches".

In Column 23, Line 41, in Claim 11, before "in an" delete "policy".

In Column 25, Line 12, in Claim 17, after "the" insert -- plurality of --.

Signed and Sealed this  
Eleventh Day of May, 2021

Drew Hirshfeld  
*Performing the Functions and Duties of the  
Under Secretary of Commerce for Intellectual Property and  
Director of the United States Patent and Trademark Office*